US008946619B2

(12) United States Patent
Wu et al.

(10) Patent No.: US 8,946,619 B2
(45) Date of Patent: Feb. 3, 2015

(54) TALBOT-ILLUMINATED IMAGING DEVICES, SYSTEMS, AND METHODS FOR FOCAL PLANE TUNING

(75) Inventors: Jigang Wu, Minhang (CN); Shuo Pang, Pasadena, CA (US); Zheng Li, Pasadena, CA (US); Guoan Zheng, Pasadena, CA (US); Changhuei Yang, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 328 days.

(21) Appl. No.: 13/451,543

(22) Filed: Apr. 20, 2012

(65) Prior Publication Data

US 2012/0267515 A1    Oct. 25, 2012

Related U.S. Application Data

(60) Provisional application No. 61/477,502, filed on Apr. 20, 2011.

(51) Int. Cl.
| | |
|---|---|
| *H01J 5/16* | (2006.01) |
| *G02B 21/08* | (2006.01) |
| *G02B 21/00* | (2006.01) |
| *G02B 21/24* | (2006.01) |

(Continued)

(52) U.S. Cl.
CPC .......... *G02B 21/086* (2013.01); *G02B 21/0044* (2013.01); *G02B 21/244* (2013.01); *G02B 21/361* (2013.01); *G02B 27/4227* (2013.01)
USPC ....................................................... 250/216

(58) Field of Classification Search
USPC ....................................................... 250/216
See application file for complete search history.

(56) References Cited

U.S. PATENT DOCUMENTS

| 4,165,464 A | 8/1979 | Ikeda et al. |
| 4,580,151 A | 4/1986 | Bamba |
| 4,981,362 A | 1/1991 | DeJong et al. |

(Continued)

FOREIGN PATENT DOCUMENTS

| EP | 1371965 | 12/2003 |
| JP | 80-015156 | 1/1996 |

(Continued)

OTHER PUBLICATIONS

International Search Report and Written Opinion in International Application No. PCT/US2011/025751 mailed on Oct. 25, 2011.

(Continued)

*Primary Examiner* — Thanh Luu
(74) *Attorney, Agent, or Firm* — Sheila Martinez-Lemke; Weaver Austin Villeneuve & Sampson LLP

(57) ABSTRACT

A Talbot-illuminated imaging system for focal plane tuning, the device comprising a Talbot element, a tunable illumination source, a scanning mechanism, a light detector, and a processor. The element generate san array of focused light spots at a focal plane. The tunable illumination source shifts the focal plane to a plane of interest by adjusting a wavelength of light incident the Talbot element. The scanning mechanism scans an object across an array of focused light spots in a scanning direction. The light detector determines time-varying light data associated with the array of focused light spots as the object scans across the array of light spots. The processor constructs an image of the object based on the time-varying data.

19 Claims, 10 Drawing Sheets

(51) Int. Cl.
*G02B 21/36* (2006.01)
*G02B 27/42* (2006.01)

(56) References Cited

U.S. PATENT DOCUMENTS

| | | | |
|---|---|---|---|
| 5,384,573 A | 1/1995 | Turpin | |
| 5,583,342 A | 12/1996 | Ichie et al. | |
| 5,587,832 A | 12/1996 | Krause | |
| 5,795,755 A | 8/1998 | Lemelson | |
| 5,796,112 A | 8/1998 | Ichie | |
| 5,936,764 A | 8/1999 | Kobayashi | |
| 5,973,316 A | 10/1999 | Ebbesen et al. | |
| 6,133,986 A | 10/2000 | Johnson | |
| 6,219,441 B1 | 4/2001 | Hu | |
| 6,248,988 B1 | 6/2001 | Krantz | |
| 6,525,815 B2 | 2/2003 | Kung et al. | |
| 6,628,385 B1 | 9/2003 | Osipchuk et al. | |
| 6,636,300 B2 | 10/2003 | Doemens et al. | |
| 6,646,773 B2 | 11/2003 | Garner | |
| 6,731,391 B1 | 5/2004 | Kao et al. | |
| 6,865,246 B2 | 3/2005 | Yang | |
| 7,045,781 B2 | 5/2006 | Adamec et al. | |
| 7,057,806 B2 | 6/2006 | Atkinson | |
| 7,209,287 B2 | 4/2007 | Lauer | |
| 7,235,777 B2 | 6/2007 | Hecht | |
| 7,250,598 B2 | 7/2007 | Hollingsworth et al. | |
| 7,310,150 B2 | 12/2007 | Guillermo et al. | |
| 7,358,478 B2 | 4/2008 | Price | |
| 7,400,436 B2 | 7/2008 | Hendriks et al. | |
| 7,468,507 B2 | 12/2008 | Rogers et al. | |
| 7,477,380 B2 | 1/2009 | Knebel et al. | |
| 7,567,346 B2 | 7/2009 | Fomitchov et al. | |
| 7,576,862 B2 | 8/2009 | Cromwell et al. | |
| 7,641,856 B2 | 1/2010 | Padmanabhan et al. | |
| 7,642,536 B2 | 1/2010 | Baer | |
| 7,751,048 B2 | 7/2010 | Yang et al. | |
| 7,768,654 B2 | 8/2010 | Cui et al. | |
| 7,773,227 B2 | 8/2010 | Yang et al. | |
| 7,982,883 B2 | 7/2011 | Cui et al. | |
| 8,039,776 B2 | 10/2011 | Cui et al. | |
| 8,189,204 B2 | 5/2012 | Cui et al. | |
| 8,767,216 B2 | 7/2014 | Yang et al. | |
| 8,855,265 B2 | 10/2014 | Engel et al. | |
| 2002/0159047 A1 | 10/2002 | Dubois | |
| 2003/0203502 A1 | 10/2003 | Zenhausern et al. | |
| 2003/0218756 A1 | 11/2003 | Chen et al. | |
| 2005/0162440 A1 | 7/2005 | Kleen | |
| 2005/0190376 A1 | 9/2005 | Wegmann et al. | |
| 2005/0271548 A1 | 12/2005 | Yang et al. | |
| 2005/0286101 A1 | 12/2005 | Garner et al. | |
| 2006/0152780 A1 | 7/2006 | Klug et al. | |
| 2007/0086020 A1 | 4/2007 | Han et al. | |
| 2007/0109619 A1 | 5/2007 | Eberl et al. | |
| 2007/0109633 A1 | 5/2007 | Stelzer | |
| 2007/0207061 A1 | 9/2007 | Yang et al. | |
| 2007/0245363 A1 | 10/2007 | Bakker et al. | |
| 2007/0258096 A1 | 11/2007 | Cui et al. | |
| 2007/0277192 A1 | 11/2007 | Hendriks et al. | |
| 2008/0008939 A1 | 1/2008 | Klug et al. | |
| 2008/0049234 A1 | 2/2008 | Seitz | |
| 2008/0100892 A1* | 5/2008 | Hendriks et al. | 359/33 |
| 2008/0121790 A1 | 5/2008 | Grier | |
| 2008/0212430 A1 | 9/2008 | Bakker et al. | |
| 2009/0218514 A1 | 9/2009 | Klunder et al. | |
| 2009/0218527 A1 | 9/2009 | French et al. | |
| 2009/0225319 A1 | 9/2009 | Lee et al. | |
| 2009/0225411 A1 | 9/2009 | Cui et al. | |
| 2009/0225413 A1 | 9/2009 | Stelzer et al. | |
| 2009/0231689 A1 | 9/2009 | Pittsyn et al. | |
| 2009/0276188 A1 | 11/2009 | Cui et al. | |
| 2010/0059696 A1 | 3/2010 | Heintzmann et al. | |
| 2010/0099984 A1 | 4/2010 | Graser | |
| 2010/0195873 A1 | 8/2010 | Cui et al. | |
| 2010/0309457 A1 | 12/2010 | Cui et al. | |
| 2010/0322494 A1 | 12/2010 | Fauver et al. | |
| 2011/0085219 A1 | 4/2011 | Yang et al. | |
| 2011/0170105 A1 | 7/2011 | Cui et al. | |
| 2011/0181884 A1 | 7/2011 | Cui et al. | |
| 2011/0205339 A1 | 8/2011 | Pavani et al. | |
| 2011/0205352 A1 | 8/2011 | Pavani et al. | |
| 2011/0234757 A1 | 9/2011 | Zheng et al. | |
| 2012/0061554 A1 | 3/2012 | Cui et al. | |
| 2012/0098950 A1 | 4/2012 | Zheng et al. | |
| 2012/0223217 A1 | 9/2012 | Zheng et al. | |
| 2012/0228475 A1 | 9/2012 | Pang et al. | |

FOREIGN PATENT DOCUMENTS

| | | |
|---|---|---|
| JP | 2003207454 A | 7/2003 |
| JP | 2003524779 A | 8/2003 |
| KR | 10-2005-006253 | 6/2005 |
| WO | WO-0210713 A2 | 2/2002 |
| WO | WO-2008107702 A1 | 9/2008 |
| WO | WO 2010040570 A1 * | 4/2010 |
| WO | WO 2011/035299 | 3/2011 |
| WO | WO 2011/047053 | 4/2011 |
| WO | WO-2011106324 | 9/2011 |
| WO | WO-2011106327 | 9/2011 |
| WO | WO 2012/122398 | 9/2012 |
| WO | WO 2012/145566 | 10/2012 |

OTHER PUBLICATIONS

International Search Report in International Application No. PCT/US2011/025762 mailed on Oct. 25, 2011.
Written Opinion in International Application No. PCT/US2011/025762 mailed on Oct. 25, 2011.
International Search Report and Written Opinion in International Application No. PCT/US2010/052512 mailed on Apr. 18, 2011.
European Patent Office (EPO) European Supplementary Search Report in EP Application No. 05749488.2 mailed on Jan. 26, 2012.
European Patent Office (EPO) European Supplementary Search Report in EP Patent Application No. 08730664.3 mailed Feb. 7, 2012.
Japanese Patent Office (JPO) Office Action in JPO patent Application No. 2007-515164 (Jul. 26, 2011).
Japanese Patent Office (JPO) Office Action in JPO patent Application No. 2007-515164 (May 8, 2012).
Japanese Patent Office (JPO) Office Action in JPO patent Application No. 2009-553675 (Jan. 24, 2012).
European Patent Office (EPO) Office Action in EP Patent Application No. 05749488.2 mailed on Jun. 27, 2012.
United States Patent and Trademark Office (USPTO) Office Action in U.S. Appl. No. 12/398,050 mailed on Nov. 14, 2011.
United States Patent and Trademark Office (USPTO) Notice of Allowance in U.S. Appl. No. 12/398,050 mailed on Jul. 17, 2012.
United States Patent and Trademark Office (USPTO) Office Action in U.S. Appl. No. 12/398,098 mailed on May 25, 2011.
United States Patent and Trademark Office (USPTO) Restriction Requirement in U.S. Appl. No. 12/399,823 mailed on Aug. 10, 2011.
United States Patent and Trademark Office (USPTO) Non-Final Office Action in U.S. Appl. No. 12/399,823 mailed on Nov. 14, 2011.
United States Patent and Trademark Office (USPTO) Final Office Action in U.S. Appl. No. 12/399,823 mailed on May 25, 2012.
"Beam Steering Using Liquid Crystals," Boulder Nonlinear Systems, downloaded from the Internet at http://www.bnonlinear.com/papers/LCBeamSteering.pdf, May 8, 2001.
"Talbot Effect," Wikipedia, last modified Dec. 27, 2011.
"Nipkow Disk" Wikipedia, last modified Aug. 13, 2010.
Bates et al, "Multicolor super-resolution imaging with photo-switchable fluorescent probes," Science 317, 1749-1753 (2007).
Besold, G. and Lindlein, "Fractional Talbot effect for periodic microlens arrays", Optics Engineering, vol. 36, pp. 1099-1105 (Apr. 1997).
Betzig, E., et al.,"Imaging intracellular fluorescent proteins at nanometer resolution," Science, vol. 313, pp. 1642-1645 (2006).
Bishara et al., "Lensfree on-chip microscopy over a wide field-of-view using pixel super-resolution," Opt. Expr. 18, pp. 11181-11191 (2010).

(56) References Cited

OTHER PUBLICATIONS

Chalut, K. J., et al., "Quantitative phase microscopy with asynchronous digital holography," Optics EXpress, vol. 15, pp. 3047-3052 (2007).
Conchello, Jose-Angel, and Lichtman, Jeff W., "Optical sectioning microscopy," Nature Methods, vol. 2, No. 12, pp. 920-931 (Dec. 2005).
Cui, Xiquan, et al., "Lensless high-resolution on-chip optofluidic microscopes for *Caenorhabditis elegans* and cell imaging," Proceedings of the National Academy of Sciences of the Unities States of America, vol. 105, pp. 10670-10675 (2008).
Di Mambro et al., "Sharpness limitations in the projection of thin lines by use of the Talbot experiment," J. Opt. Soc. Am. A 21, pp. 2276-2282 (2004).
Eah et al., "Nearly diffraction-limited focusing of a fiber aXicon microlens," Rev. Sci. Instrum. 74(11), 4969-4971 (2003).
Frey, H.G., et al.,"High-resolution imaging of single fluorescent molecules with the optical near-field of a metal tip," Phys. Rev. Let. 93, 200801 (2004).
Giloh et al., "Fluorescence microscopy: reduced photobleaching of rhodamine and fluorescein protein conjugates by n-Propyl Gallate," Science 217, pp. 1252-1255 (1982).
Grosjean et al., "Fiber MicroaXicons Fabricated by a Polishing Technique for the Generation of Bessel-Like Beams," Applied Optics 46(33) 8061-8063 (2007).
Heng, Xin, et al., "An Optical Tweezer Actuated, Nanoaperture-grid based Optofluidic Microscope Implimentation Method," Optics EXpress, vol. 15, No. 25, 16367-75 (2007).
Heng, Xin, et al., "Optofluidic Microscopy—a method for implementing a high resolution optical microscope on a chip," Lab Chip, vol. 6, pp. 1274-1276 (2006).
Ho, J., et al., "Use of whole slide imaging in surgical pathology quality assurance: design and pilot validation studies," Human Pathology 37, pp. 322-331 (2006).
Kimura, Yasuo, et al., "Compact optical head using a holographic optical element for CD players," Appl. Opt. 27, pp. 668-671 (1988).
Lee, Lap Man, et al., "The Application of On-Chip Optofluidic Microscopy for Imaging *Giardia lamblia* Trophozoites and Cysts," Biomed Microdevices, Springer DOI 10.1007/s10544-009-9312-X (2009).
Leger, J.R., et al, "Efficient array illuminator using binary-optics phase plates at fractional-Talbot planes," Optics Letters 15, pp. 288-290 (1990).
Lohmann, A.W. and Silva D.E., "An Interferometer based on the Talbot Effect," Optics Communications, vol. 2, No. 9, pp. 413-415 (Feb. 1971).
Marquet, Pierre, et al., "Digital holographic microscopy: a noninvasive contrast imaging technique allowing quantitative visualization of living cells with subwavelength aXial accuracy," Optics Letters, vol. 30, No. 5, pp. 468-470 (Mar. 2005).
Miao, Qin, et al., "Dual-modal three-dimensional imaging of single cells with isometric high resolution using an optical projection tomography microscope," Journal of Biomedical Optics, vol. 14 (2009).
Merenda, F., et al., "Miniaturized high-NA focusing-mirror multiple optical tweezers," Opt. EXp. 15, 6075-6086 (2007).
Montgomery, W.D., "Self-Imaging Objects of Infinite Aperture," J. Opt. Soc. Am., vol. 57, pp. 772-775 (1967).
Oheim, "High-throughput microscopy must re-invent the microscope rather than speed up its functions," Brit, J. Pharm. 152, op. 1-4 (2007).
Pang, Sean, et al., "Implementation of a color-capable optofluidic microscope on a RGB CMOS color sensor chip substrate," Lab on a Chip, vol. 10, pp. 411-414 (2010).
Patorski, "The self-imaging phenomenon and its applications," Progress in Opt. 27, pp. 3-108 (1989).
Pfeiffer, F., et al., "Hard-X-ray dark-field imaging using a grating interferometer," Nature Materials 7, pp. 134-137 (2008).
Pfeiffer, Franz, et al., "Phase retrieval and differential phase-contrast imaging with low-brilliance X-ray sources," Nat. Phys, vol. 2, pp. 258-261 (published online on Mar. 26, 2006).
Planchon, et al., "Rapid three-dimensional isotropic imaging of living cells using Bessel beam plane illumination," Nat. Methods 8(5) (2011).
Rojo, et al., "Critical comparison of 31 commercially available digital slide systems in pathology," Int'l J. Surg. Path. 14, pp. 285-305 (2006).
Sanchez, E.J., et al., "Near-field fluorescence microscopy based on two-photon eXcitation with metal tips," Phys. Rev. Let. 82, 4014 (1999).
Talbot, "LXXVI. Facts relating to optical science. No. IV," Philosophical Magazine Series 39, pp. 401-407 (1836).
Tao et al., "The generation of an array of nondiffracting beams by a single composite computer generated hologram," J. Opt. A: Pure Appl. Opt. 7, 40-46 (2005).
Titus, Charles M., et al., "Efficient, Accurate Liquid Crystal Digital Light Deflector," Proc. SPIE, vol. 3633(1), pp. 244-253 (Jun. 1999).
Tsien, Roger, et al., "Fluorophores for Confocal Microscopy: Photophysics and Photochemistry," Handbook of Biological Confocal Microscopy, third edition, Springer Science + Business Media, pp. 38-352 (2006).
Turunen, et al., "Holographic generation of diffraction-free beams," Appl. Opt. 27(19), 3959-3962 (1988).
Wu, et al., "Focal Plane tuning in Wide Field-of-view Microscope with Talbot Pattern Illumination," Opt. Lett. 36, 2179-2181 (2011).
Wu, J., et al., "Focus grid generation by in-line holography," Optics Express, vol. 18, p. 14366-14374 (2010).
Wu, J., Cui, X., Lee, L. M., and Yang, C., "The application of Fresnel zone plate based projection in optofluidic microscopy," Opt. Exp. 16, 15595 (2008).
Wu, J., et al., "Wide field-of-view microscope based on holographic focus grid illumination," Optics Letters, vol. 35, No. 13 (2010).
Zapata-Rodriguez, Carlos, et al., "Three-dimensional Field Distribution in the Focal Region of Low-Fresnel-Number AXicons," F. Opt. Soc. Am. A 23(12) 3016-3017 (2005).
Zheng, G.A., et al., "Sub-pixel resolving optofluidic microscope for on-chip cell imaging," Lab on a Chip, vol. 10, pp. 3125-3129 (2010).
Zheng, G., et al., "Supplementary Information for: Sub-pixel resolving optofluidic microscope for on-chip cell imaging," Lap Chip, vol. 10 (2010).
Zhu et al., "Generation of controllable nondiffracting beams using multimode optical fibers," Appl. Phys. Lett. 94, 201102 (2009).
Wu, Jigang, et al., "Focal plane tuning in wide-field-of-view microscope with Talbot pattern illumination," Optics Letters 36 (12), pp. 2179-2181 (2011).
Zheng, Guoan, "The ePetri dish, an on-chip cell imaging platform based on subpixel perspective sweeping microscopy (SPSM)," Proceedings of the National Academy of Science 108 (41), pp. 16889-16894 (2011).
Pang, Shuo, et al., "Fluorescence microscopy imaging with a Fresnel zone plate array based optofluidic microscope," Lab on a Chip 11, 3698-3702, (2011).
United States Patent and Trademark Office (USPTO) Non-Final Office Action in U.S. Appl. No. 12/903,650 dated on Jan. 14, 2013.
United States Patent and Trademark Office (USPTO) Final Office Action in U.S. Appl. No. 12/903,650 dated on Nov. 7, 2013.
United States Patent and Trademark Office (USPTO) Notice of Allowance in U.S. Appl. No. 12/903,650 dated on Feb. 26, 2014.
United States Patent and Trademark Office (USPTO) Notice of Allowance in U.S. Appl. No. 12/903,650 dated on Apr. 25, 2014.
United States Patent and Trademark Office (USPTO) Non-Final Office Action in U.S. Appl. No. 13/032,449 dated on Mar. 7, 2014.
United States Patent and Trademark Office (USPTO) Non-Final Office Action in U.S. Appl. No. 13/032,529 dated on Feb. 13, 2014.
United States Patent and Trademark Office (USPTO) Non-Final Office Action in U.S. Appl. No. 12/399,823 dated on May 15, 2014.
PCT International Preliminary Report on Patentability and Written Opinion dated Apr. 26, 2012 issued in PCT/US2010/052512.
PCT International Preliminary Report on Patentability and Written Opinion dated Sep. 7, 2012 issued in PCT/US2011/025751.

(56) References Cited

OTHER PUBLICATIONS

PCT International Preliminary Report on Patentability dated Sep. 7, 2012 issued in PCT/US2011/025762.
PCT International Search Report and Written Opinion dated Sep. 3, 2012 issued in PCT/US2012/028328.
PCT International Preliminary Report on Patentability and Written Opinion dated Sep. 19, 2013 issued in PCT/US2012/028328.
PCT International Search Report and Written Opinion dated Nov. 28, 2012 issued in PCT/US2012/034339.
PCT International Preliminary Report on Patentability and Written Opinion dated Oct. 31, 2013 issued in PCT/US2012/034339.
Brockie et al., (Mar. 1, 2001) "Differential Expression of Glutamate Receptor Subunits in the Nervous System of *Caenorhabditis elegans* and Their Regulation by the Homeodomain Protein UNC-42," *The Journal of Neuroscience*, 21(5):1510-1522.
Coskun, A.F., et al., (Sep. 7, 2011) "Wide-field lensless fluorescent microscopy using a tapered fiber-optic faceplate on a chip," *Analyst*, 136(17):3512-3518.
Dubey et al., (2007) "Wavelength-scanning Talbot effect and its application for arbitrary three-dimensional step-height measurement," *Optics Communications*, 279:13-19.
Garcia-Sucerquia, J. et al., (2006) "Immersion digital in-line holographic microscopy," *Optics Letters*, 31:1211-1213.
Goodman et al., (2005) "Holography," Chapter 9: pp. 297-393, *Introduction to Fourier Optics*, 3rd Edition, Roberts & Company Publishers.
Han, (2013) "Wide-Field-of-View On-Chip Talbot Fluorescence Microscopy for Longitudinal Cell Culture Monitoring from within the Incubator," *Analytical Chemistry* 85(4):2356-2360.
Lange et al., (2005) "A microfluidic shadow imaging system for the study of the nematode *Caenorhabditis elegans* in space," *Sensors and Actuators B*, 107:904-914.
Mudanyali, O., et al., (Jun. 7, 2010) "Compact, light-weight and cost-effective Microscope based on Lensless Incoherent Holography for Telemedicine Applications," *Lab on a Chip*, 10:1417-1428, 25 pp.
Ottevaere et al., (2006) "Comparing glass and plastic refractive microlenses fabricated with different technologies," *Journal of Optics a-Pure and Applied Optics*, 8(7):S407-S429.
Pang et al., (Dec. 1, 2012) "Wide and Scalable Field-of View Talbot-Grid-Based Fluorescence Microscopy," *Optic Letters* 37(23):5018-5020.
Pang et al., (Jun. 17, 2013) "Wide Field of View Talbot grid-based microscopy for multicolor fluorescence imaging," *Optic Express*, 21(12):14555-14565.
Perkins et al., (1986) "Mutant Sensory Cilia in the Nematode *Caenorhabditis elegans*," *Developmental Biology*, 117:456-487.
Repetto L., et al., (2004) "Lensless digital holographic microscope with light-emitting diode illumination," *Opt. Lett.*, 29:1132-1134.
Richard et al., (2009) "An integrated hybrid interference and absorption filter for fluorescence detection in lab-on-a-chip devices," *Lab on a Chip*, 9:1371:1376.
Seo, et al., (2009) "Lensfree holographic imaging for on-chip cytometry and diagnostics," *Lab on a Chip*, 9(6):777-787.
Slavich "Technical specifications of holography materials," downloaded from the Internet at http://www.slavich.com/holo_summary [retrieved on Jun. 12, 2013], 2pp.
Spring, Kenneth R., et al., "Introduction to Fluorescence Microscopy," <http://www.microscopyu.com/articles/fluorescence/fluorescenceintro.html> (Aug. 25, 2004).
Tam et al., (May 24, 2004) "An imaging fiber-based optical tweezer array for microparticle array assembly," *Appl. Phys. Lett.*, 84(21):4289-4291.
Tsien, Roger, et al., (1998) "The green fluorescent protein," *Annual Review of Biochemistry*, 67:509-544.
Wang et al. (Jun. 26, 2012) "Deep-tissue focal fluorescence imaging with digitally time-reversed ultrasound-encoded light," *Nature Communications* 3(928):8 pages.
Xu, et al. (2001) "Digital in-line holography for biological applications," *PNAS USA*, 98:11301-11305.
United States Patent and Trademark Office (USPTO) Notice of Allowance in U.S. Appl. No. 13/032,449 dated on Nov. 3, 2014.
United States Patent and Trademark Office (USPTO) Final Office Action in U.S. Appl. No. 13/032,529 dated on Sep. 11, 2014.
United States Patent and Trademark Office (USPTO) Notice of Allowance in U.S. Appl. No. 13/415,657 dated on Nov. 4, 2014.
United States Patent and Trademark Office (USPTO) Final Office Action in U.S. Appl. No. 12/399,823 dated on Nov. 10, 2014.
López-Mariscal, Carlos et al., (Jan. 1, 2007) "The generation of nondiffracting beams using inexpensive computer-generated holograms," Am. J. Phys., 75(1):36-42.

\* cited by examiner (a)

(b)

(a)

(b)(1)

(b)(2)

TALBOT-ILLUMINATED IMAGING DEVICES, SYSTEMS, AND METHODS FOR FOCAL PLANE TUNING

CROSS-REFERENCES TO RELATED APPLICATIONS

This is a non-provisional application of, and claims priority to, U.S. Provisional Patent Application No. 61/477,502 entitled "Wide Field-of-View Microscopy Based on Talbot Illumination with Focal Plane Tuning Capability," filed on Apr. 20, 2011. This provisional application is hereby incorporated by reference in its entirety for all purposes.

This non-provisional application is related to the following co-pending and commonly-assigned patent applications, which are hereby incorporated by reference in their entirety for all purposes:

U.S. patent application Ser. No. 12/903,650 entitled "Holographically Illuminated Imaging Devices" filed on Oct. 13, 2010.

U.S. patent application Ser. No. 13/415,718 entitled "Talbot Imaging Devices and Systems" filed on Mar. 8, 2012.

STATEMENT REGARDING FEDERALLY SPONSORED RESEARCH AND DEVELOPMENT

This invention was made with government support under Grant No. W81XWH-09-1-0051 awarded by the US Army Medical Research and Material Command. The government has certain rights in the invention.

BACKGROUND OF THE INVENTION

Embodiments of the present invention generally relate wide field-of-view, high resolution imaging devices. More specifically, certain embodiments relate to Talbot-illuminated imaging (TII) devices, systems, and methods for focal plane tuning, used for wide field-of-view imaging in areas such as, for example, microscopy and photography.

Wide field-of-view microscopic imaging is highly desired in applications such as digital pathology or high throughput screening. Some examples of digital pathology and high throughput screening applications that may use wide field-of-view imaging are described in Ho, J., Parwani, A. V., Jukic, D. M., Yagi, Y., Anthony, L., and Gilbertson, J. R., "Use of whole slide imaging in surgical pathology quality assurance: design and pilot validation studies," Human Pathology 37, pp. 322-331 (2006) and Oheim, M., "High-throughput microscopy must re-invent the microscope rather than speed up its functions," British Journal of Pharmacology 152, 1-4 (2007), which are hereby incorporated by reference in their entirety for all purposes.

Some recent efforts address the need for wide field-of-view imaging, but present significant technical limitations. Some examples of these efforts can be found in Bishara, W., Su, T. W., Coskun, A. F., and Ozcan, A., "Lensfree on-chip microscopy over a wide field-of-view using pixel super-resolution," Optics Express 18, pp. 11181-11191 (2010) and Rojo, M. G., Garcia, G. G., Mateos, C. P., Garcia, J. G., and Vicente, M. C., "Critical comparison of 31 commercially available digital slide systems in pathology," International Journal of Surgical Pathology 14, pp. 285-305 (2006), which are hereby incorporated by reference in their entirety for all purposes. Another example is the recent development of wide field-of-view microscopes based on holographic focus grid illumination. Some examples of recently developed microscopes based on holographic focus grid illumination can be found in Wu, J., Cui, X., Zheng, J, Wang, Y. M., Lee, L. M., and Yang, C., "Wide field-of-view microscope based on holographic focus grid illumination," Optics Letters 35, pp. 2188-2190 (2010) and Wu, J., Lee, L. M., and Yang, C., "Focus grid generation by in-line holography," Optics Express 18, pp. 14366-14374 (2010), which are hereby incorporated by reference in their entirety for all purposes.

BRIEF SUMMARY OF THE INVENTION

Embodiments of the present invention relate to TII devices, systems, and methods for focal plane tuning (e.g., z-axis scanning). Embodiments include a TII device having a Talbot element, a tunable illumination source illuminating the Talbot element, a scanning mechanism, and a light detector (e.g., imaging sensor). The Talbot element is a patterned structure (e.g., aperture mask) that generates an array of focused light spots (focus grid) at repeated distances away from the Talbot element due to the Talbot effect. The tunable illumination source shifts the focal plane of the array of focused light spots by adjusting the wavelength of a collimated light beam incident the Talbot element. In some cases, the tunable illumination source tunes the focal plane at a plane of interest, such a plane through an object being imaged. The scanning mechanism scans the object across the focused light spots as the light detector measures time varying light data (e.g., linescans) altered and unaltered by the object. A processor can reconstruct an image of the object from the time varying light data.

One embodiment is directed to a Talbot-illuminated imaging device for focal plane tuning. The devices comprises a Talbot element and a tunable illumination source. The Talbot element is configured to generate an array of focused light spots at a focal plane. The tunable illumination source configured to shift the focal plane to a plane of interest by adjusting a wavelength of light incident the Talbot element. In some cases, the device also includes a scanning mechanism and a light detector. The scanning mechanism is configured to move an object relative to the array of focused light spots in a scanning direction. The light detector is configured to determine time-varying light data associated with the array of focused light spots as the object moves relative to the array of light spots.

One embodiment is directed to a Talbot-illuminated imaging system for focal plane tuning. The system comprises a Talbot-illuminated imaging device and a processor. The Talbot-illuminated imaging device includes a Talbot element, a tunable illumination source, a scanning mechanism, and a light detector. The Talbot element generates an array of focused light spots at a focal plane. The tunable illumination source is configured to shift the focal plane to a plane of interest by adjusting a wavelength of light incident the Talbot element. The scanning mechanism is configured to move an object relative to the array of focused light spots in a scanning direction. The light detector is configured to determine time-varying light data associated with the array of focused light spots as the object moves relative to the array of light spots. The processor is configured to reconstruct an image of the object based on the time-varying light data.

One embodiment is directed to a method of focal plane tuning using a Talbot-illuminated imaging system having a Talbot element, a tunable illumination source, a scanning mechanism and a light detector. The method includes providing light of an incident wavelength to the Talbot element to generate an array of focused light spots. The method also includes adjusting, by the tunable illumination source, the incident wavelength to shift the focal plane of the array of focused light spots. The method also includes capturing time-varying light data associated with the array of focused light spots as an object moves relative to the array of focused light spots. In addition, the method includes constructing an image of the object based on the time varying light data.

These and other embodiments of the invention are described in further detail below.

BRIEF DESCRIPTION OF THE DRAWINGS

FIG. 7(b)(2) is a cross-sectional intensity profile of group 8, element 6 from the expanded view of the region indicated in FIG. 7(b)(1), according to an embodiment of the invention.

DETAILED DESCRIPTION OF THE INVENTION

Figure 1:
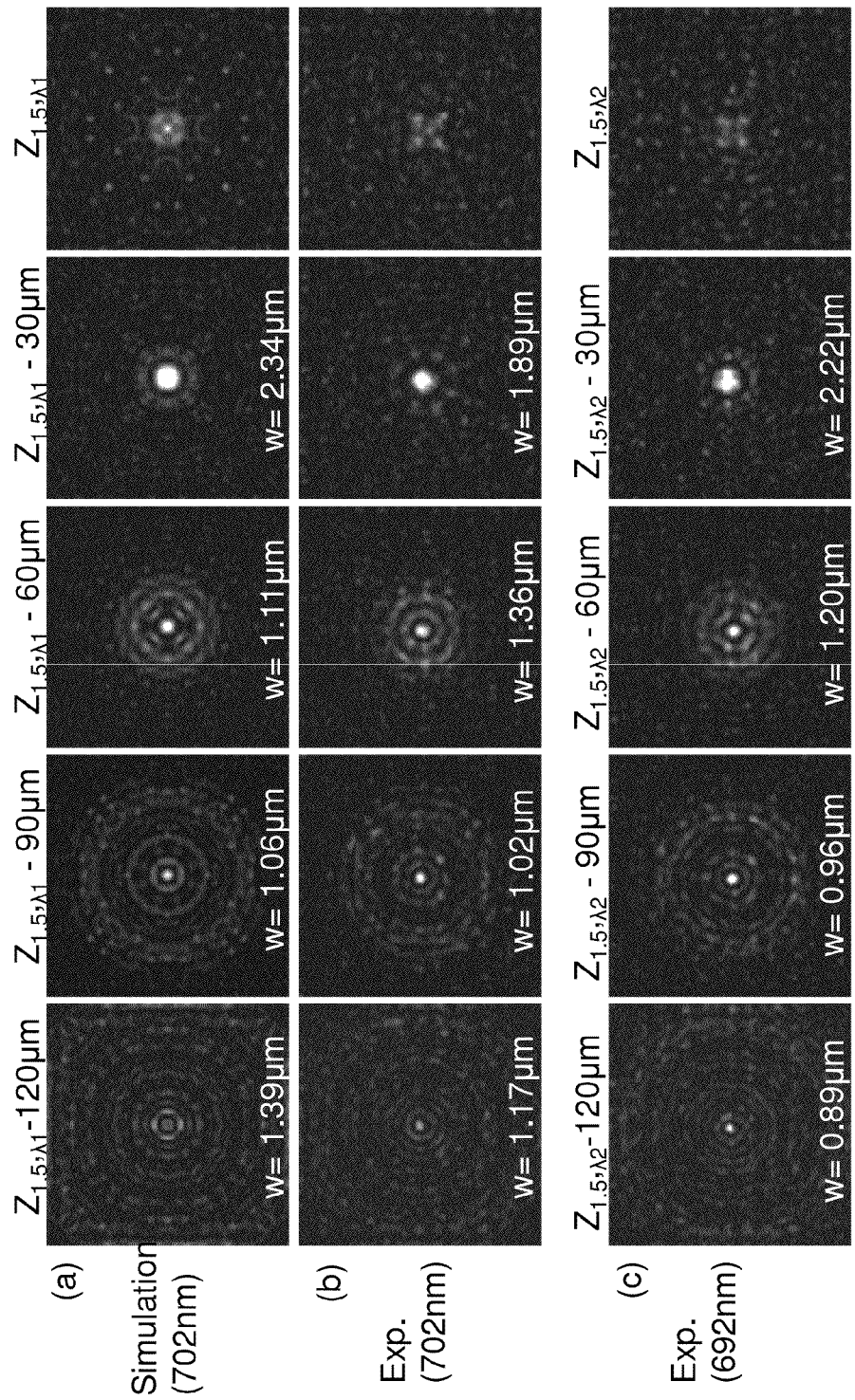
FIG. 1(a) is a series of images of evolving Talbot patterns at different planes around the Talbot plane at $z=Z_{1.5,\lambda 1}$ where $\lambda_1=702$ nm, based on numerically simulated results, according to embodiments of the invention.
FIG. 1(b) is a series of images of evolving Talbot patterns at different planes around the Talbot plane at $z=_{1.5,\lambda 1}$ for $\lambda_1=702$ nm based on experimental characterization results as observed under a conventional microscope with 60× objective, according to embodiments of the invention.
FIG. 1(c) is a series of images of evolving Talbot patterns at different planes around the Talbot plane at $z=_{1.5,\lambda 1}$ for $\lambda_1=692$ nm, based on experimental characterization results as observed under a conventional microscope with 60× objective, according to embodiments of the invention.

Embodiments of the present invention will be described below with reference to the accompanying drawings. Some embodiments include TII devices, TII systems, and methods for focal plane tuning. Focal plane tuning refers to adjusting the wavelength of light incident a Talbot element to move the focal plane of a repeated Talbot image to a plane of interest. Embodiments include a TII device having a Talbot element, and a tunable illumination source (e.g., tunable laser) providing collimated light to the Talbot element. The Talbot element is a patterned structure (e.g., aperture mask) capable of generating an array of focused light spots at repeated distances away from the Talbot element based on the Talbot effect. The tunable illumination source can adjust the wavelength of incident light to move the focal plane of the array of focused light spots to a plane of interest. The TII device also includes a scanning mechanism and a light detector. The scanning mechanism moves an object being imaged across the array of focused light spots in a scanning direction. The light detector receives light from the array of focused light spots that may be altered and unaltered by the object. The light detector measures time-varying light data associated with each of the focused light spots. The processor reconstructs an image of the object at the plane of interest by compiling the time-varying light data from each focused light spot and properly shifting the data according to the scanning speed. In some cases, the incident wavelength can be tuned to change the focal plane multiple times (z-axis scanning) to obtain images at different focal planes.

Embodiments of the invention provide one or more technical advantages over other wide field-of-view imaging systems. One advantage over a holographically illuminated method is that accurate generation of an array of light spots is more repeatable and robust because the Talbot element can be an aperture mask fabricated using microfabrication techniques. Another advantage is that, unlike previous holographically illuminated imaging methods, there is no zero-order transmission of the incident beam in the Talbot effect. This will enhance the contrast of the light spots on the light detector and thus the signal-to-noise ratio of the image. Another advantage is that the focused light spots are more uniform in their powers (spot-to-spot comparison), which can improve the accuracy of the image. A main advantage of embodiments of the TII system is the capability of focal plane tuning by adjusting the incident wavelength. Some previous holographically illuminated imaging systems require mechanical translation of the holographic element to image at different focal planes, which could be time consuming and mechanically complex. In embodiments of the invention, the incident wavelength of the tunable illumination source can be tuned to change the focal plane multiple times in order to obtain images at different focal planes. The elimination of mechanical scanning along the focal axis (z-axis scanning) can be a significant advantage for fast scanning microscopy applications.

I. Introduction to Talbot Effect and Focal Plane Tuning

The Talbot effect is a phenomenon in which certain patterned structures (e.g., aperture mask with a periodic grid of apertures) repeat the patterned image at regular distance intervals away from the patterned structures (Talbot element). The Talbot effect has been described, for example, in Talbot, H. F., "*LXXVI. Facts relating to optical science. No. IV,*" Philosophical Magazine Series 39, pp. 401-407 (1836), which is hereby incorporated by reference in its entirety for all purposes. The distance interval between the repeated patterned images is referred to as a Talbot distance ($Z_T$) or the half Talbot distance ($Z_{T\_2}$). For a square periodic grid (two-dimensional array) patterned structure, the Talbot distance can be calculated as:

$$Z_T = 2d^2/\lambda \quad \text{(Eqn. 1)}$$

where d is the pattern period and $\lambda$ is the wavelength of the incident light, as has been shown, for example, in Montgomery, W. D. "*Self-Imaging Objects of Infinite Aperture*," J. Opt. Soc. Am. 57, pp. 772-775 (1967), which is hereby incorporated by reference in its entirety for all purposes. Patterned images will be repeated at Talbot planes at integer multiples of the Talbot distances:

$$z = mZ_T = m2d^2/\lambda \quad \text{(Eqn. 2)}$$

where m is an integer.

Also, phase-reversed patterned images will be repeated at half Talbot distances half way between the Talbot planes of Eqn. 2. A half Talbot distance can be calculated as:

$$Z_{T\_2} = d^2/\lambda \quad \text{(Eqn. 3)}$$

where d is the pattern period and $\lambda$ is the wavelength of the incident light. The phase-reversed patterned images will be repeated at Talbot planes:

$$z = (m-1/2)2d^2/\lambda \quad \text{(Eqn. 4)}$$

where m is an integer.

Furthermore, a fractional Talbot effect generates a shrunken patterned image between the Talbot planes described in Eqns. 2 and 4. For a Talbot element of a square periodic grid patterned structure, the fractional Talbot effect generates a focused light spot grid that has a smaller pitch than the original patterned structure. The fractional Talbot effect is described in Besold, B. and Lindlein, N. "Fractional Talbot effect for periodic microlens arrays", Optics Engineering 36, 1099-1105 (1997), which is hereby incorporated by reference in its entirety for all purposes. By utilizing the fractional Talbot effect, the TII system 10 could generate more focused light spots than the aperture number of the Talbot element.

However, strict Application of the Talbot effect described in Eqns. 1-4 has limitations in some cases. For example, the 'self-imaging' ability of the Talbot effect is only a paraxial approximation as discussed in Patorski, K., "*The self-imaging phenomenon and its applications*, "Progress in Optics 27, pp. 3-108 (1989), which is hereby incorporated by reference in its entirety for all purposes. In other words, the Talbot effect will 'self-image' the apertures in a mask well only if the aperture diameter d is much larger than $\lambda$, as discussed in Besold, B., and Lindlein, N., Fractional Talbot effect for periodic microlens array," Optics Engineering 36, pp. 1099-1105 (1997) and Di Mambro, E., Haidar, R., Guerineau, N., and Primot, J., "Sharpness limitations in the projection of thin lines by use of the Talbot experiment," J. Opt. Soc. Am. A 21, pp. 2276-2282 (2004), which are hereby incorporated by reference in their entirety for all purposes. The Talbot effect will fail and result in 'self-image' light spots that are substantially larger (less focused) if the aperture diameter is comparable to $\lambda$.

Since image resolution obtainable by the TII system 10 at least partially depends on the size of the focused light spots generated by the Talbot effect, generating tightly focused light spots is highly desired by the TII system 10. Strict application of the Talbot effect may not work well in some cases and may not provide tightly focused light spots at the Talbot planes described in Eqns. 2 and 4. It has been determined, however, that the Talbot field propagation generates tightly focused light spots in planes that are slightly away (above or below) from the Talbot planes described in Eqns. 2 and 4 if the aperture diameter is comparable to $\lambda$.

FIG. 1(*a*) is a series of images of evolving Talbot patterns at different planes around the Talbot plane at $z=Z_{1.5,\lambda1}$ where $\lambda_1=702$ nm, based on numerically simulated results, according to embodiments of the invention. FIG. 1(*b*) is a series of images of evolving Talbot patterns at different planes around the Talbot plane at $z=_{1.5,\lambda1}$ for $\lambda_1=702$ nm based on experimental characterization results as observed under a conventional microscope with 60× objective, according to embodiments of the invention. FIG. 1(*c*) is a series of images of evolving Talbot patterns at different planes around the Talbot plane at $z=_{1.5,\lambda1}$ for $\lambda_1=692$ nm, based on experimental characterization results as observed under a conventional microscope with 60× objective, according to embodiments of the invention. The Talbot element used in the numerical simulation and experimental characterization of FIGS. 1(*a*), 1(*b*) and 1(*c*) was an aperture mask with a periodicity d of 30 μm and uniform aperture size a of 800 nm. FIGS. 1(*a*), 1(*b*), and 1(*c*) include the z positions and w, the full width at half maximum (FWHM), of the lights spots except those in the last column.

The last column in FIGS. 1(*a*), 1(*b*), and 1(*c*) corresponds to the plane at $z=Z_{1.5}$. As shown in the last column, the Talbot effect fails to generate the most tightly focused light spots at the Talbot plane at $z=Z_{1.5}$. That is, the self-imaging approximation does not appear to be valid for this regime where aperture size a of 800 nm is comparable to the wavelength of $\lambda_1=702$ nm or $\lambda_1=692$ nm.

Based on Eqns. 1 and 3, the Talbot distance $Z_T$ and Talbot half distance $Z_{T\_2}$ of a Talbot element with a square periodic grid pattern are inversely proportional to the incident wavelength, $\lambda$. For small changes of incident wavelength, i.e., $\Delta\lambda \ll \lambda$, the Talbot distance change (i.e. change in focal plane of square periodic grid pattern) can be calculated as:

$$\Delta Z_T = -2d^2 \Delta\lambda/\lambda^2 \quad \text{(Eqn. 5)}$$

Based on Eqn. 5, the focal plane shift $\Delta z$ of a focal plane of an array of focused light spots can be calculated as: $\Delta z = -2d^2 \Delta\lambda/\lambda^2$ for a change of incident wavelength of $\Delta\lambda$. For example, a square periodic grid patterned structure with a periodicity of d=30 μm and a nominal wavelength of 700 nm may have a plane shift of 55 μm at $z=Z_{1.5}$ for a small wavelength change of 10 nm.

In FIG. 1(*c*), the incident wavelength was adjusted by $\Delta\lambda=692$ nm−702 nm=−10 nm from FIG. 1(*b*). FIG. 1(*c*) shows the spot pattern closely resembling the spot pattern from FIG. 1(*b*). However, the focused light spots have shifted by $\Delta z$ of 55 μm to another focal plane away from the Talbot element. This shift is consistent with the prediction from Eqn. 5 ($Z_{1.5,\lambda2} - Z_{1.5,\lambda1} = 55$ μm).

FIGS. 1(*a*), 1(*b*), and 1(*c*) also show that each light spot generally consists of a bright central spot and associated concentric rings. As the Z position increases, the bright center spot get brighter and larger, while the concentric rings get smaller and finally disappear. From observing the evolving of the light spots, it is shown that the best light spots for imaging are those around $z=Z_{1.5}−90$ μm. For smaller Z positions, the center spot is too weak for a good contrast imaging. While for larger Z positions, the center spot is larger and cannot provide high-resolution images. The observed light spots show that the TII system 10 of embodiments may achieve a resolution of ~1 μm, which was also verified by acquiring images of a USAF target in the experiment. The size of each pattern figure in FIGS. 1(a), 1(b) and 1(c) is 30×30 μm.

In embodiments, the TII system 10 tunes (shifts) the focal plane of the light spots to move the plane to or close to a plane of interest such as a plane through an object being examined. By tuning the focal plane, the TII system 10 can adjust the Talbot distance so that the illumination pattern at the plane of interest has more focused (tighter) light spots. The TII system 10 uses a tunable illumination source to adjust the incident wavelength to tune the focal plane. This tuning ability can be used to accomplish non-mechanical focal plane tuning in the TII system 10.

II. TII System

Figure 2:
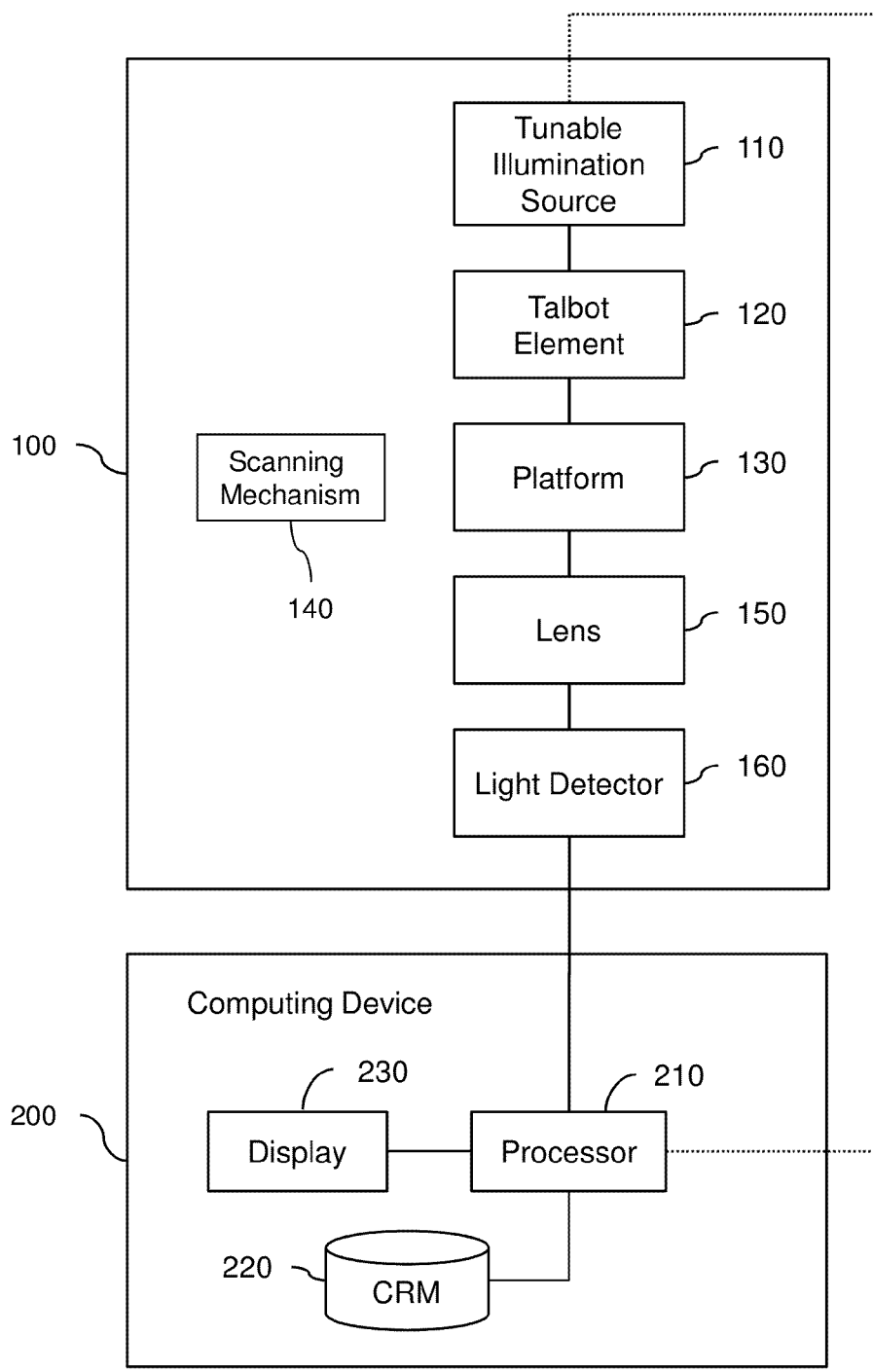
FIG. 2 is a block diagram of components of a TII system for focal plane tuning, according to embodiments of the invention.

FIG. 2 is a block diagram of components of a TII system 10 for focal plane tuning, according to embodiments of the invention. The TII system 10 includes a TII device 100 and a computing device 200 in electronic communication with the TII device 100. Although the illustrated embodiment includes a single TII device 100 and a single computing device 200, other embodiments may include two or more TII devices 100 and/or computing devices 200.

The TII device 100 includes a tunable illumination source 110, a Talbot element 120, a platform 130, a scanning mechanism 140, relay lenses 150, and a light detector 160. The tunable illumination source 110 is in communication with the Talbot element 120 to provide collimated light (beam) to the Talbot element 120. The Talbot element 120 generates a light field with an array of focused light spots (Talbot image) at a focal plane at a distance away from the Talbot element 130. The tunable illumination source 110 can move the focal plane of the array of focused light spots to a plane of interest by adjusting the wavelength of the collimated light. The platform 130 can receive one or more objects being imaged by the TII system 10. Although not shown, the scanning mechanism 140 may be in communication with the platform 130 or with the object(s) to move the object(s) relative to the array of focused light spots and/or may be in communication with the Talbot element 120 to move the array of focused light spots relative to the object(s). The relay lenses 150 is in communication with the platform 130 to collect and relay light as may or may not be altered by the object(s) on the platform 130. The light detector 160 is in communication with the relay lenses 150 to receive the light from the relay lenses 150 and capture time-varying light data as the object(s) moves relative to the array of focused light spots.

The computing device 200 includes a processor 210, a computer readable medium (CRM) 220, and display 230. The display 230 and CRM 220 are in electronic communication with the processor 210. The display 230 is in electronic communication with the processor 210 to receive image data and other data for display. The processor 210 is in electronic communication with the CRM 220 to retrieve/store code with instructions for completing functions of the TII system 10. The processor 210 is in electronic communication with the light detector 160 to receive one or more signals with the time-varying light data. Although not shown, the processor 210 may also be in communication with the tunable illumination source 110 to send signal(s) to control the wavelength of the collimated light to the Talbot element 120 to tune the focal plane of the array of focused light spots. The processor 210 reconstructs one or more images of the object(s) from the time-varying light data.

A tunable illumination source 110 can refer to any suitable device or combination of devices that can provide collimated light 112 (e.g., collimated beam) to the Talbot element 120 and can adjust the wavelength of the collimated light 112 in a wavelength range $\Delta\lambda$ between an initial wavelength $\lambda_0$ and a final wavelength $\lambda_1$. In some cases, the tunable illumination source 110 can incrementally adjust the wavelength to wavelengths between the initial wavelength $\lambda_0$ and a final wavelength $\lambda_1$. Any suitable increment (e.g., 10 nm, 20 nm, 5 nm, etc.) can be used. Any suitable number (e.g., 2, 4, 10, etc.) of increments can be used. An example of a suitable device is a tunable laser (e.g., tunable Ti:Sapphire laser). Suitable devices are commercially available. The tunable illumination source 110 can be placed in any suitable location appropriate for providing collimated light 112 to the Talbot element 120. The tunable illumination source 110 may be a component of the TII device 100 or may be separate from the TII device 100. The light properties (wavelength ($\lambda$), phase, intensity, etc.) of the collimated light 112 may have any values suitable for operation of the TII system 10.

A Talbot element 120 can refer to any suitable patterned structure(s) capable of creating a light field that repeats an intensity pattern (Talbot image) at distances away from the Talbot element 120 based on the Talbot effect (including fractional Talbot effect). Some examples of suitable patterned structures include a layer with an array of light transmissive regions 122, a micro-lens array, micro-concave mirror array, phase/amplitude gratings, other patterned diffraction structure, or any suitable combination thereof. The layer may be made of any suitable material(s) (e.g., metallic material) of any suitable thickness(es). The listed arrays may be one-dimensional arrays, two-dimensional arrays, or combination of one-dimensional and two-dimensional arrays with dimensions of suitable values (e.g., 1300×1100, 100×100, 30×50, 100×1, etc.).

The patterned structure of the Talbot element 120 may be a periodic structure(s) or non-periodic structure(s). A periodic structure refers to a structure with a pattern that repeats structural elements (e.g., apertures) on a periodic basis according to pattern period (periodicity), d. The periodic structure may be periodic in a single lateral direction or both lateral directions of the Talbot element 120. The pattern period, d, may be any suitable value (e.g., 5 microns, 15 microns, 20 microns, 30 microns, 100 microns, etc.). Some examples of suitable periodic structures are one-dimensional and two-dimensional arrays of uniformly spaced structures. Any suitable structure (e.g., apertures, microlenses, etc.) can be used.

In embodiments, the Talbot element 120 may be an aperture mask (i.e. material layer with apertures) having an array of light transmissive regions 122. Each light transmissive region 122 may be a vacuum or gas-filled space, or filled with transparent material such as such water or a viscous polymer (e.g., SU-8 resin). The array of light transmissive regions 122 may be a one-dimensional array, a two-dimensional array, or a combination of one and two-dimensional arrays. The array of light transmissive regions 122 has dimensions of any suitable values (e.g., 1300×1100, 100×100, 30×50, 100×1, etc.). The light transmissive regions 122(a) in the array 122 may have any suitable shape (e.g., circular, rectangular, etc.) and any suitable size (e.g., 0.4 microns, 0.6 microns, 0.8 microns, 1 micron, etc.). For example, the light transmissive regions 122(a) in some examples has a uniform width, a, which is comparable to the wavelength $\lambda$ of the incident collimated light 112.

In some cases, the aperture mask (i.e. material layer with light transmissive regions) may include a two-dimensional array of light transmissive regions 122. In one case, the two-dimensional array of light transmissive regions 122 has a uniform pattern period d and uniform size a. A way to generate a two-dimensional array of focused light spots 124 (focus grid) is to illuminate the aperture mask with collimated light 112 (e.g., collimated beam). The focus grid is then generated around Talbot planes at: $z=mZ_T$ or $z=(m-1/2)Z_T$, where $Z_T$ is the Talbot distance, as described by Eqns. 2 and 4. The pitch p of the focus grid will be the same as the pattern period d and the width b of the focused light spots $124(a)$ will be similar to the size a for the basic Talbot effect.

In embodiments, the Talbot element 120 may be a layer with a microlens array. In these embodiments, a main array of focused light spots 124 (main focus grid) may be generated at the main focal plane of the microlens array. The main focus grid may generate more focus grids around Talbot planes at: $z=mZ_T$ or $z=(m-1/2)Z_T$, where $Z_T$ is the Talbot distance as described in Eqns. 2 and 4. The width b of the focused light spots $124(a)$ may be limited by the numerical aperture of the microlens in some cases.

In embodiments, the Talbot element 130 may be designed so that the distance between the light spots $124(a)$ is larger than the size (e.g., pixel size) of the light detecting elements $160(a)$ in the light detector 160. With this design, each light detecting element $160(a)$ corresponds to a single light spot $124(a)$ and the intensity (e.g., emission intensity) from each light spot $124(a)$ can be differentiated.

The intensity pattern can refer to a pattern of repeated elements (e.g., light spots $124(a)$). The intensity pattern may be, for example, an array of focused light spots 124. The pitch p of the intensity pattern refers to the distance between repeated elements (e.g., light spots $124(a)$) of the intensity pattern. For example, the pitch p of an array of focused light spots 124 is the distance between two adjacent light spots $124(a)$ in the array of focused light spots 124. A width b can refer to the width of the repeated element (e.g., diameter of a circular light spot $124(a)$).

The geometry of intensity pattern (e.g., an array of focused light spots 124) may correspond to the periodic pattern in the Talbot element 120 or may correspond to fractional values. For example, the pitch p between the light spots $124(a)$ may be the same as pattern period p of the Talbot element 130. In a fractional Talbot effect example, the pitch p between the light spots $124(a)$ may be a fraction (e.g., ½, ¼, etc.) of the pattern period p of the Talbot element 130. In the first example, the shape and size of the light spots may directly correspond to the shape and size of elements (e.g., apertures) in the periodic structure of the Talbot element 130.

The TII system 10 of embodiments uses the array of focused light spots 124 generated by the Talbot effect or fractional Talbot effect for illumination in wide field-of-view imaging. In some cases, the TII system 10 uses a second phase reversed image (m=2) of the Talbot effect having a Talbot plane at $Z_{1.5}=1.5\ Z_T$.

A focal plane of an intensity pattern (e.g. array of focused light spots 124) can refer to a plane at which the repeated elements (e.g., light spots $124(a)$) are most focused. In some cases, a focal plane 125 may be around a Talbot plane at: $z=mZ_T$ or $z=(m-1/2)Z_T$, where $Z_T$ is the Talbot distance as described in Eqns. 2 and 4. In a case where the incident wavelength λ of the incident collimated light 112 is comparable to the width a of the light transmissive region, the focal plane 125 may be located away from the Talbot plane.

A plane of interest 126 can refer to a plane at which the TII system 10 or user of the TII system 10 may be imaging or otherwise investigating. A plane of interest 126 may be, for example, a plane (section) through one or more objects being imaged. The plane of interest 126 may be in any suitable direction. In some embodiments, the plane of interest 126 is parallel to the platform surface with the object(s) being imaged and is located at a distance $z_1$ from the Talbot element 120. Other suitable directions may be used in other embodiments.

In embodiments, the TII system 10 tunes the focal plane 125 by adjusting the light spots $124(a)$ to the plane of interest 126. That is, the focal plane 125 of the array of focused light spots 126 may be moved to or close to the plane of interest 126. In the illustrated embodiment in FIG. 4, for example, the focal plane 125 of the array of focused light spots 124 is moved from an initial location at a distance $z_0$ from the Talbot element 120 to the plane of interest 126 at a distance $z_1$ from the Talbot element 120. In this example, the tunable illumination source 110 adjusted the wavelength of the incident light 112 by Δλ to tune the focal plane 125 a distance of $z=z_1-z_0$. In some cases, the tunable illumination source 110 may adjust the wavelength λ in small increments (Δλ/n) to finely tune the focal plane 125 between the initial location and the final location.

A platform 130 can refer to any suitable transparent structure(s) capable of receiving an object(s) 300 for imaging by the TII system 10. The platform 130 may also include structures or other devices for holding the objects 300. For example, the platform 130 may be a transparent slide/dish and cover.

The scanning mechanism 140 can refer to a suitable device(s) capable of moving the object(s) 300 being imaged across the array of focused light spots 124 or moving the array of focused light spots 124 across the object(s) 300. For example, the scanning mechanism 140 may move the platform with the object(s) 300 across the array of focused light spots 124, may move the object(s) 300 across the array of focused light spots 124, may move the Talbot element 120 so that the array of focused light spots 124 move across the object(s) 300, etc. The scanning mechanism 140 can be based on any suitable method including, for example, microfluidic flow methods, optical tweezing methods, and scanning methods (raster scanning, linear scanning, etc.). In one example, the scanning mechanism 140 may include a raster scanning device for raster scanning the object(s) 300 or platform 130 with the object(s) 300 through the light spots $124(a)$ or raster scanning the light spots $124(a)$ over the object(s) 300. An example of a scanning mechanism 140 employing a microfluidic flow method includes a fluid channel having a fluid flow with the object 300 being imaged. The scanning mechanism 130 can be in any suitable location.

The scanning mechanism 140 moves the object(s) 400 or array of focused light spots 124 in a scanning direction. In embodiments, the scanning direction is at a small angle θ from a x-axis or y-axis of the array of focused light spots 124. The scanning direction may be, for example, in the direction along an x'-axis at a small angle θ from a x-axis. As another example, the scanning direction may be in the direction along an y'-axis at a small angle θ from a y-axis.

The relay lenses 150 refer to one or more suitable lenses capable of relaying light from the array of light spots 124 to the light detector 160. The light from the one or more light spots $124(a)$ includes light altered and unaltered by object(s) 300 being imaged by the TII system 10. In one example, each relay lens 150 may be capable of relaying light from a single light spot $124(a)$ to a single light detecting element $160(a)$. The relay lenses 150 may have any suitable numerical aperture value and may have any suitable spacing.

Figure 4:
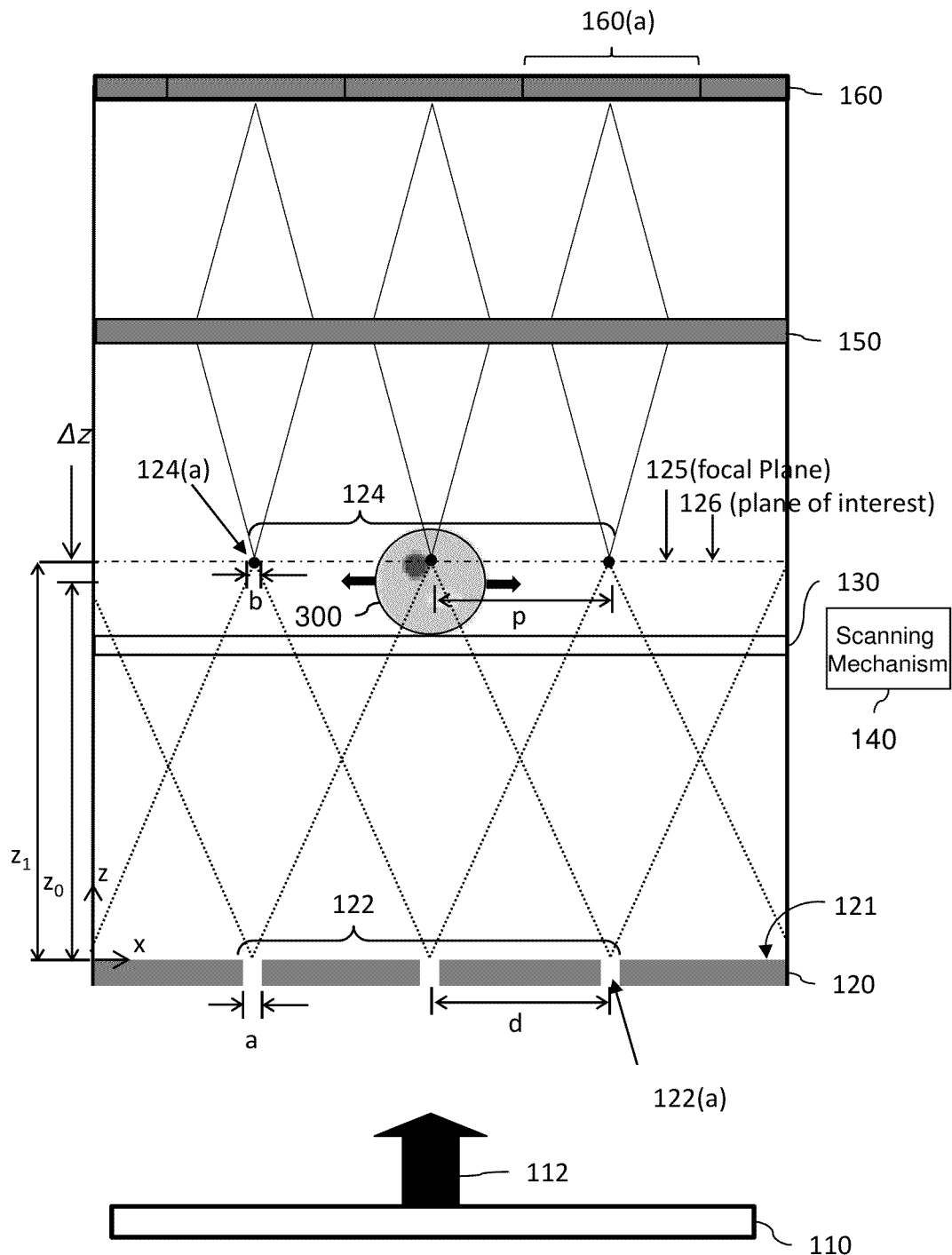
FIG. 4 is a cross-sectional side view of a portion of a TII device for focal plane tuning, according to embodiments of the invention.

A light detector 160 can refer to a suitable device or combination of devices capable of receiving light, measuring/recording time-varying light data associated with the light received, and generating one or more signals with time-varying light data. The one or more signals with time-varying light data may be in the form of an electrical current from the photoelectric effect. In some cases, the light detector 160 may be in the form of a one-dimensional linear array of a two-dimensional array of discrete light detecting elements 160(a) (as shown in FIG. 4) of any suitable size (e.g., 1-10 microns) and any suitable shape (e.g., circular, rectangular, square, etc.). Some examples of suitable devices include a complementary metal oxide semiconductor (CMOS) imaging sensor array, a charge coupled device (CCD), electron multiplying charge coupled device (EMCCD), an avalanche photo-diode (APD) array, a photomultiplier tubes (PMT) array, and a photo-diode (PD) array. These light detectors 160 and others are commercially available. The light detector 160 can be a monochromatic detector or a multi-color detector (e.g., RGB detector).

Time-varying light data can refer to any suitable information related to the light received and measured by the light detector 160. If the light detector 160 is the form of multiple discrete light detecting elements 160(a) (as shown in FIG. 4), the time-varying light data may include suitable information related to the light received and measured by the multiple discrete light detecting elements 160(a) on a time-varying basis. In some cases, each light detecting element 160(a) can generate a signal with time-varying light data based on light received and measured by the light detecting element 160(a). Time-varying light data may include, for example, properties of the light received such as the intensity(ies) of the light, the wavelength(s) of the light, the frequency or frequencies of the light, the polarization(s) of the light, the phase(s) of the light, the spin angular momentum(s) of the light, and/or other light properties associated with the light received by the light detector 160 and/or each light detecting element 160(a). Time-varying light data may also include the scanning location, of the location of the light detecting element(s) 160(a) receiving the light, the time that the light was received, or other information related to the light received. In some cases, each light detecting element 160(a) can generate time varying information associated with a single focused light spot 124. The time-varying light data can be compiled to construct an image or images of the object(s) 300.

An object can refer to any suitable entity, such as a biological or inorganic entity, or portion of an entity. Examples of suitable biological entities include cells, cell components (e.g., proteins, nuclei, etc.), microorganisms such as bacteria or viruses, etc. Although one or two objects 300 are shown in illustrated embodiments, any suitable number (e.g., 1, 2, 3, 4, 5, 10, 100, etc.) of objects 300 can be imaged by the TII system 10.

A computing device 200 can refer to any suitable combination of devices capable of performing computing and controlling functions of the TII system 10 such as reading out the collected signal(s) from the light detector 160, triggering the functioning of components of the TII system 10, reconstructing an image of one or more objects, etc. Some examples of suitable computing devices include a personal computer (desktop, laptop, etc.), a mobile communications device (e.g., smartphone or tablet), or other suitable device. In FIG. 2, the TII system 10 includes the computing device 200. Alternatively, the computing device 200 can be a separate device from the TII system 10.

A processor 210 can refer to any suitable processing device (e.g., microprocessor). The processor 210 can receive signals with time-varying light data from the light detector 160 associated with the light received by the light detecting elements 160(a). The processor 210 executes code stored on the CRM 220 to perform functions of TII system 10 such as interpreting time-varying light data from the light detector 160 and constructing one or more images from the time-varying light data.

The CRM 220 (e.g., memory) stores code for performing some functions of system 10. The code is executable by the processor 210. For example, the CRM 220 may include code for: c) code for interpreting time-varying light data received in one or more signals from the light detector 160, d) code for constructing one or more images of object from the time-varying light data, f) code for displaying images on the display 230, g) and/or any other suitable code for performing functions of the TII system 10. The CRM 220 may also include code for performing any of the signal processing or other software-related functions that may be created by those of ordinary skill in the art. The code may be in any suitable programming language including C, C++, Pascal, etc. The processor 210 may be in any suitable location. In FIG. 2, the processor 210 is located in the computing device 200. In another embodiment, the processor 210 may be located in the light detector 160.

The display 230 can refer to an suitable device for displaying reconstructed images, light data, and other suitable data. Some examples of suitable displays include a computer monitor, cell phone panel, projection, etc. Suitable displays are commercially available. The display 230 may be a monochromatic or multi-color display. Also, the display may be a two-dimensional or three-dimensional display, etc. In one case, the image display 230 may be capable of displaying multiple views.

Figure 3:
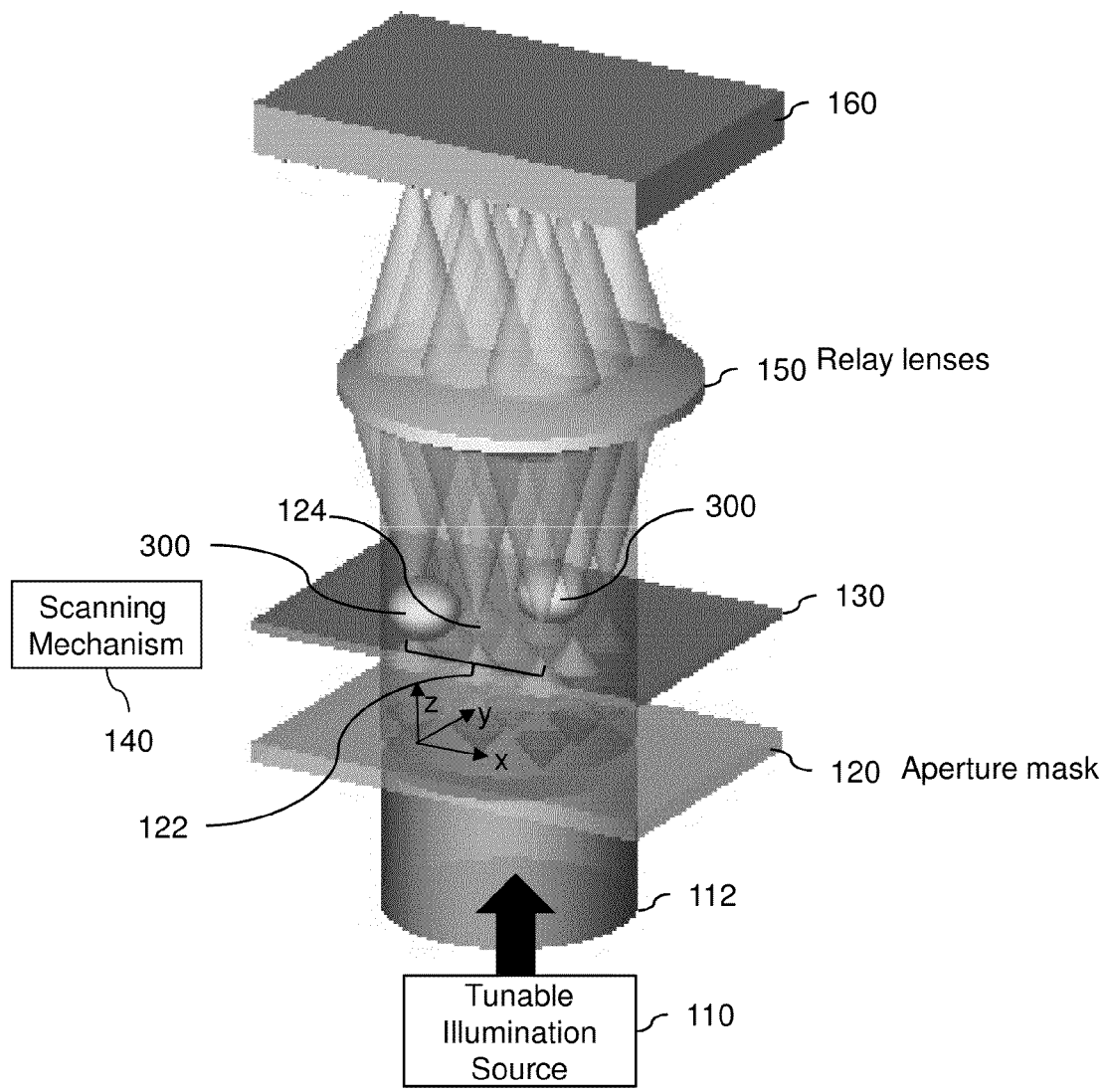
FIG. 3 is a isometric view of some components of a TII device for focal plane tuning, according to embodiments of the invention.

FIG. 3 is a isometric view of some components of a TII device 100 for focal plane tuning, according to embodiments of the invention. The TII device 100 includes a tunable illumination source 110 providing collimated light 112, a Talbot element 120 generating an array of focused light spots 122, and a transparent platform 130 with two objects 300 being imaged by the TII system 10. The Talbot element 120 (e.g., aperture mask) includes a 3×3 two-dimensional array of light transmissive regions (e.g., apertures). The array of focused light spots 124 is a 3×3 two-dimensional array comprising nine (9) focused light spots 124(a). Although the array of focused light spots 122 and array of light transmissive regions are 3×3 two-dimensional arrays, other embodiments may have arrays of other suitable dimensions. The TII device 100 also includes a scanning mechanism 140 for moving the objects 300 relative to the array of focused light spots 124. The TII device 100 also includes relay lenses 150 for relaying light from the array of focused light spots 124, which may be altered or unaltered by the objects 300. The TII device 100 also includes a light detector 160 for receiving light from the relay lenses 150 and for generating time-varying light data based on the received light as the objects 300 move relative to the array of focused light spots 124. The time-varying light data can be compiled by the processor 210 (shown in FIG. 2) to construct an image of the objects 300.

FIG. 4 is a cross-sectional side view of a portion of a TII device 100 for focal plane tuning, according to embodiments of the invention. The TII device 100 includes a tunable illumination source 110 providing collimated light 112, a Talbot element 120 generating an array of focused light spots 124, a platform 130 with an object 300 being imaged, a scanning mechanism 140, relay lenses 150, and a light detector 160 having discrete light detecting elements 160(a). The Talbot element 120 includes a 3×3 two-dimensional array of light transmissive regions 122 including nine (9) light transmissive regions 122(a) and an outer surface 121. Talbot element 120 also includes a x-axis, y-axis (not shown), and a z-axis. The x-axis and y-axis lie in a plane at the outer surface 121 of the Talbot element 120. The array of light transmissive regions 122 has a period, d, between the light transmissive regions 122(a). Each light transmissive region 122(a) in the array 122 has a width, a, along the x-direction. The Talbot element 120 generates 3×3 two-dimensional array of focused light spots 124 comprising nine (9) focused light spots 124(a). The array of focused light spots 124 lie at a focal plane 125 at a plane of interest 126 through the object 300. The plane of interest 126 is at a distance, $z_1$, from the Talbot element 120. In the illustrated example, the tunable illumination source 100 has adjusted the wavelength of the collimated light 112 incident the Talbot element 120 to move the focal plane 125 from an initial distance, $z_0$, from the Talbot element 120 to the distance, $z_1$, at the plane of interest 126. The change in distance is $\Delta z = z_1 - z_0$.

In FIG. 4, the scanning mechanism 140 moves the object 300 relative to the array of focused light spots 124. Although not shown, the scanning mechanism 140 may be in communication with the object 300 or the platform 130 with the object 300 to move the object 300 relative to the array of focused light spots 124, or may be in communication with the Talbot element 120 to be able to move the Talbot element 120 and array of focused light spots 124 relative to the object 300. The relay lenses 150 can relay light from the array of focused light spots 124, which may be altered or unaltered by the objects 300. The TII device 100 also includes a light detector 160 for receiving focused light from the relay lenses 150 and for generating time-varying light data based on the received light as the object 300 moves relative to the array of focused light spots 124. The light detector 160 includes discrete light detecting elements 160(a). In this example, each light detecting element 160(a) may receives light from a single corresponding focused light spot 124(a). In other embodiments, two or more light detecting elements 160(a) may receive light from a single focused light spots 124(a) or one light detecting element 160(a) may receive light from two or more focused light spots 124(a). The time-varying light data can be compiled by the processor 210 (shown in FIG. 2) to construct an image of the object 300.

FIG. 5(a) is an illustration of an array of focused light spots 124 on the Talbot element plane as generated by a Talbot element 120 of a TII device 100, according to embodiments of the invention. In the illustrated example, the array of focused light spots 124 is a two-dimensional array of focused light spots 124. The dimensions of the two-dimensional array may be of any suitable size (1×1, 1×10, 10×10, 30×30, 33×16, 100×100, etc.). The array of focused light spots 124 includes an x-axis and a y-axis along the two dimensions of the two-dimensional array of focused light spots 124. The array of focused light spots 124 also includes a x'-axis and a y'-axis. The x'-axis and y'-axis are tilted at a small angle θ with respect to the x-axis and y-axis. Any suitable small angle θ (e.g., 1 degree, 2 degrees, 5 degrees, etc.) may be used. In some cases, the x'-axis or the y'-axis can define the scanning direction used by the scanning mechanism 140. The scanning mechanism 140 may scan the object(s) 300 or the Talbot element 120 in a scanning direction along either the x'-axis or the y'-axis.

FIG. 5(b) is a illustration of an array of focused light spots 124 on the Talbot element plane as generated by a Talbot element 120 of a TII device 100, according to embodiments of the invention. In FIG. 5(b), the Talbot element 120 has been rotated by a suitable small angle θ. The array of focused light spots 124 is a two-dimensional array of focused light spots 124 having dimensions of any suitable size. The array of focused light spots 124 includes an x-axis and a y-axis. The array of focused light spots 124 is oriented in the x-direction along the x-axis and the y-direction along the y-axis. The array of focused light spots 124 also includes a x'-axis and a y'-axis. The x-axis and y-axis are tilted at a small angle θ with respect to the x'-axis and y'-axis. The scanning direction used by the scanning mechanism 140 is defined by either the x'-axis or the y'-axis. The scanning mechanism 140 may scan the object(s) 300 or the Talbot element 120 in a scanning direction along either the x'-axis or the y'-axis.

Since many apertures 122(a) contribute to a focused light spot 124(a), the intensity difference of the original array of light transmissive regions 122 will be partially averaged out. During image processing, the processor 210 can generate image uniformity by normalizing each line scan to compensate for the non-uniform intensity distribution of the light spots 124(a).

In an exemplary operation of a TII system 10 of embodiments, a specimen with one or more objects 300 is located on a platform 130. The processor 210 sends a trigger signal to the tunable illumination source 110 to start generating collimated light 112 with an initial wavelength $\lambda_0$. In some cases, the platform 130 may be located so that a plane of interest 126 (e.g., plane through the objects 300) is located at a Talbot plane. Upon receiving the collimated light 112, the Talbot element 120 generates a light field with an array of focused light spots 124 at a focal plane 125 at an initial distance $z_0$ from the Talbot element 120. The initial distance $z_0$ may be away from the Talbot plane if, for example, the initial wavelength $\lambda_0$ is comparable to the aperture size a. Next, the processor 210 sends a signal to the scanning mechanism 140 to start scanning and a signal to the light detector 160 to start an initial image acquisition cycle. The scanning mechanism 130 moves the platform 130 with the object(s) 300 in a scanning direction across the array of focused light spots 124 or the Talbot element 120 in a scanning direction across the object(s) 300. The relay lenses 150 receives light from the array of focused light spots 124 that has been altered and unaltered by the object(s) 300 as the object(s) 300 move relative to the array of focused light spots 124. The light detector 160 receives light from the relay lenses 150 and records time-varying light data (e.g., intensity data) of the altered and/or unaltered light as the object(s) move relative to the focused light spots 125. After the light detector 160 completes the initial acquisition cycle, it sends a handshake signal to the processor 210. The processor 210 sends a stop signal to the scanning mechanism 140 to stop scanning. The processor 210 receives a signal or signals with the time-varying light data from the light detector 160. The processor 210 can reconstruct one or more initial images of the object(s) 300 based on the time-varying light data from each focused light spot 124 and the scanning speed.

Based on the initial images, a user or the processor 210 determines a wavelength change $\Delta\lambda$ using Eqn. 5 and based on $z_1$ and $z_0$. The processor 210 may then send a signal to the tunable illumination source 110 to tune the focal plane 125 to a plane of interest 126 by adjusting the wavelength by a wavelength change $\Delta\lambda$ so that the new wavelength of the incident collimated light 112 is $\lambda_1 = \lambda_0 + \Delta\lambda$. Upon changing the wavelength, the array of focused light spots 124 is shifted to a distance $Z_1$, which may be calculated as $z_1 = z_0 - 2d^2\Delta\lambda/\lambda_0^2$. The processor 210 may send additional signals to the tunable illumination source 100 to adjust the wavelength to tune the focal plane 125 to other planes of interest 126. In some cases, the processor 210 may send signals to the tunable illumination source 100 to incrementally adjust the wavelength until the focal plane 125 is at or approximately at the plane of interest 126. Any suitable small incremental change (10 nm, 20 nm, etc.) in wavelength can be used.

Once the focal plane 125 is at or approximately at the plane of interest 124, the processor 210 sends a signal to the scanning mechanism 140 to start scanning and a signal to the light detector 160 to start image acquisition. The scanning mechanism 130 moves the platform 130 with the object(s) 300 in a scanning direction across the array of focused light spots 124. Alternatively, the scanning mechanism 140 could move the Talbot element 120 in a scanning direction to move the array of focused light spots 124 across the object(s) 300. The relay lenses 150 receives light from the array of focused light spots 124 that has been altered and unaltered by the object(s) 300 as the object(s) 300 move relative to the array of focused light spots 124. The light detector 160 receives light from the relay lenses 150 and records time-varying light data (e.g., intensity data) of the altered and/or unaltered light as the object(s) move relative to the focused light spots 125. After the light detector 160 completes the acquisition cycle, it sends a handshake signal to the processor 210. The processor 210 sends a stop signal to the scanning mechanism 140 to stop scanning. The processor 210 receives a signal or signals with the time-varying light data from the light detector 160. The processor 210 can reconstruct one or more images of the object(s) 300 based on the time-varying light data from each focused light spot 124 and the scanning speed. The processor 210 can display the one or more images at the plane of interest on the display 230.

In one case, the TII system 10 can perform z-axis scanning. In this case, the tunable illumination source 110 can be tuned to change the focal plane multiple times. For example, the tunable illumination source 110 may incrementally adjust the incident wavelength by a small value (e.g., 10 nm, 20 nm, etc.). After each adjustment, the TII system 10 can acquire an image. In these embodiments, the focal plane is tuned to multiple planes of interest and images are acquired at the multiple planes.

In one embodiment, the TII device 100 includes a tunable illumination source 110 providing collimated light 112, a Talbot element 120 generating an array of focused light spots 122, a platform 130 with object(s) 300, a scanning mechanism 140, relay lenses 150, and a light detector 160. In this embodiment, the tunable illumination source 110 and Talbot element 120 are located outside a first side of the transparent platform 130. The tunable illumination source 110 provides collimated light 112 to the Talbot element 120 to generate an array of focused light spots 124 to an object(s) 300 located outside the first side of the transparent platform 130. The light detector 160 and/or relay lenses 150 may be located on a second opposing side of the transparent platform 130.

In one embodiment, a TII device 100 may include a Talbot element 120 that has an array of light transmissive regions that are designed to diffract more light at large angles to improve in tighter light spots generation.

Modifications, additions, or omissions may be made to the TII device 100 and/or TII system 10 of embodiments without departing from the scope of the disclosure. For example, the tunable illumination source 110 may be separate from the TII device 100 and/or TII system 10 in an embodiments. As another example, the TII device 100 and/or TII system 10 may omit the lens 150 as a component. As another example, a TII device 100 and/or TII system 10 may add a filter between the object(s) and the light detector 160, for example, as a coating on side of the light detector 160 proximal the objects(s).

In addition, components of the TII device 100 and/or TII system 10 of embodiments may be integrated or separated according to particular needs. For example, the processor 210 may be integrated into the light detector 160 so that the light detector 160 performs one or more of the functions of the processor 210 in another TII system 10. As another example, the processor 210, CRM 220, and display 230 may be components of a computer separate from a TII system 10 and in communication with the TII system 10. As another example, the processor 210, CRM 220, and/or display 230 may be integrated into components of the TII device 100.

III. Experimental Results

In experiments, a TII system 10 with a TII device 100 having components arranged as illustrated in FIG. 3 was used. The Talbot element 120 was an aperture mask having an array of light transmissive regions 122 that was a two-dimensional array of apertures. The Talbot element 120 was illuminated by collimated light 112 introduced by a tunable illumination source 110 (e.g., tunable Ti: Sapphire laser). The aperture mask had a pattern period of d=30 μm and aperture size a=800 nm. The incident wavelength λ was adjusted from 692 nm ($\lambda_0$) to 702 nm ($\lambda_1$). That is, the wavelength change was Δλ=692 nm−702 nm=−10 nm. The plane of interest 126 was at a sample. The distance between the Talbot element 120 and the plane of interest 126 at the sample was set at $z_1=Z_{1.5}$ where m=2, during an initial alignment. The tunable illumination source was first set to an initial incident wavelength $\lambda_0$. At $\lambda_0$, the focal plane 125 was located at $z_0$. Subsequently, the tunable illumination source 100 finely adjusted the incident wavelength to a final incident wavelength $\lambda_1$. At this wavelength, the focal plane 125 is located at the plane of interest 126 through the object 300.

According to Eqn. 5, the tuning range Δz of the focal plane position was 55 μm in the experiment. The sample with objects 300 was then illuminated by the array of focused light spots 124 (focus grid) and the transmission of the light spots 124 was projected by the relay lenses 150 (e.g., the Edmund Optics.® NT45-760 relay lenses) onto an light detector 160 (e.g., Lumenera® imaging sensor). The sample was scanned across the focus grid in the scanning direction (y'-direction). The scanning direction (y'-direction) is slightly tilted at a small angle θ with respect to the focus grid, which is oriented at x- and y-direction. The image can be reconstructed by compiling line scans from each focused lights spots 124 and properly shifting each the time varying light data according to the scanning speed.

Figure 6:
FIG. 6(a) is an image of a portion of the two-dimensional array of apertures in the Talbot element of the TII device, according to an embodiment of the invention.
FIG. 6(b) is an image of a portion of the focus grid at $z=Z_{1.5}$, according to an embodiment of the invention.
Figure 6:

FIG. 6(a) is an image of a portion of the two-dimensional array of apertures in the Talbot element 110 of the TII device 100, according to an embodiment of the invention. FIG. 6(b) is an image of a portion of the focus grid at $z=Z_{1.5}$, according to an embodiment of the invention. The intensity uniformity of the focus grid was more uniform than the original array of apertures. The averaged relative adjacent spot intensity variation is 4% for the focus grid and 20% for the original array of apertures (aperture grid). Since many apertures contribute to a focused light spot 124(a), the intensity difference of the original array of apertures will be partially averaged out, which creates this increased intensity uniformity. During image processing, the processor 210 can generate image uniformity by normalizing each line scan to compensate for the non-uniform intensity distribution of the focused light spots 124(a).

Next, the TII system 10 was used in an imaging demonstration. The array of focused light spots 124 was a two-dimensional array having dimensions of 213×60 (in x-direction and y-direction, respectively), and the scanning was performed in the y'-direction. Thus the reconstructed image is oriented in the x' and y'-direction. The image will have a saw-tooth shape at the starting and ending part because of the linear scanning characteristics. The effective field-of-view in the x'-direction is 213*d≈6.4 mm. In the experiments, the sample was moved at a speed of v=0.165 mm/s for L=6 mm. At the same time, the light detector 160 acquired 12,000 frames at F=330 frames/s. The exposure time of the light detector 160 was 0.5 ms. Thus, the sampling distance in the y'-direction is v/F=0.5 μm. The sampling distance in the x'-direction is determined by the angle θ between the scanning direction (y'-direction) and the grid orientation (y-direction), which was set to be 0.0167. And thus, the sampling distance in x'-direction is d*sin(θ)=0.5 μm. The effective FOV in the y'-direction can be calculated by L–H=4.2 mm, where H=60*d=1.8 mm is the extent of focus grid in y-direction.

Figure 7:
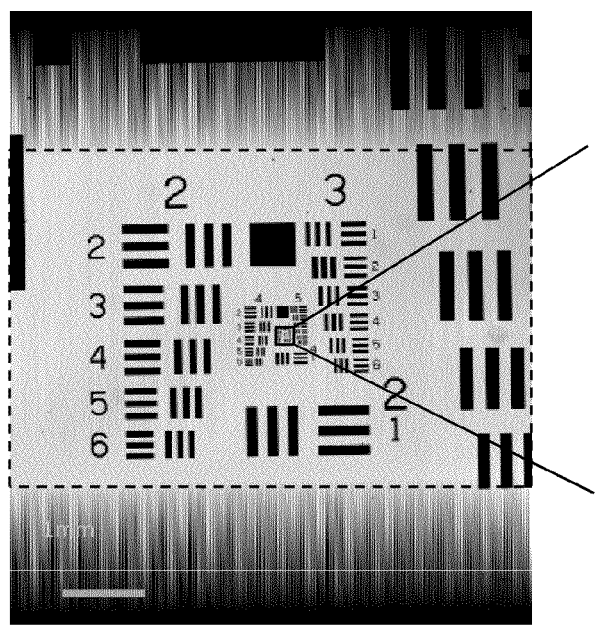
FIG. 7(a) is a wide field-of-view image of the U.S. Air Force (USAF) target acquired by the TII system, according to an embodiment of the invention.
FIG. 7(b)(1) is an expanded view of the region indicated in FIG. 7(a), according to an embodiment of the invention.
Figure 7:
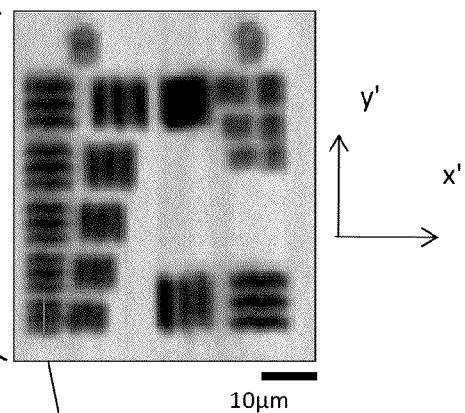
Figure 7:
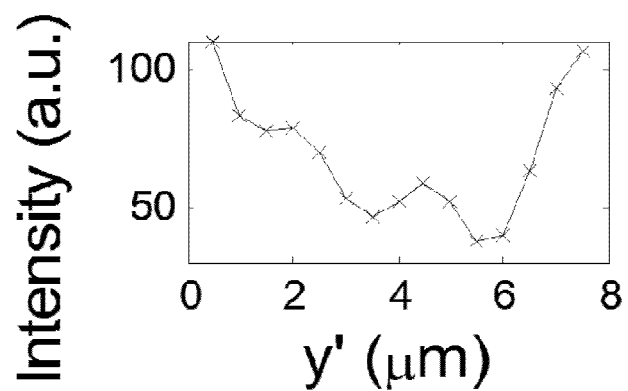

Next, the TII system 10 was used in a resolution test to image a U.S. Air Force (USAF) target. FIG. 7(a) is a wide field-of-view image of the U.S. Air Force (USAF) target acquired by the TII system 10, according to an embodiment of the invention. The effective field-of-view of the TII system 10 was 6.4×4.2 mm. The effective field-of-view is indicated in the large dashed rectangle in FIG. 7(a). FIG. 7(b)(1) is an expanded view of the region indicated in FIG. 7(a), according to an embodiment of the invention. FIG. 7(b)(2) is a cross-sectional intensity profile of group 8, element 6 from the expanded view of the region indicated in FIG. 7(b)(1), according to an embodiment of the invention. The features size with a line width of 1.1 μm (group 8, element 6) can be resolved, which agrees with the measured spot size of ~1 μm shown in FIG. 1. The focal spot size was measured to be ~1 μm under a conventional microscope.

Figure 8:
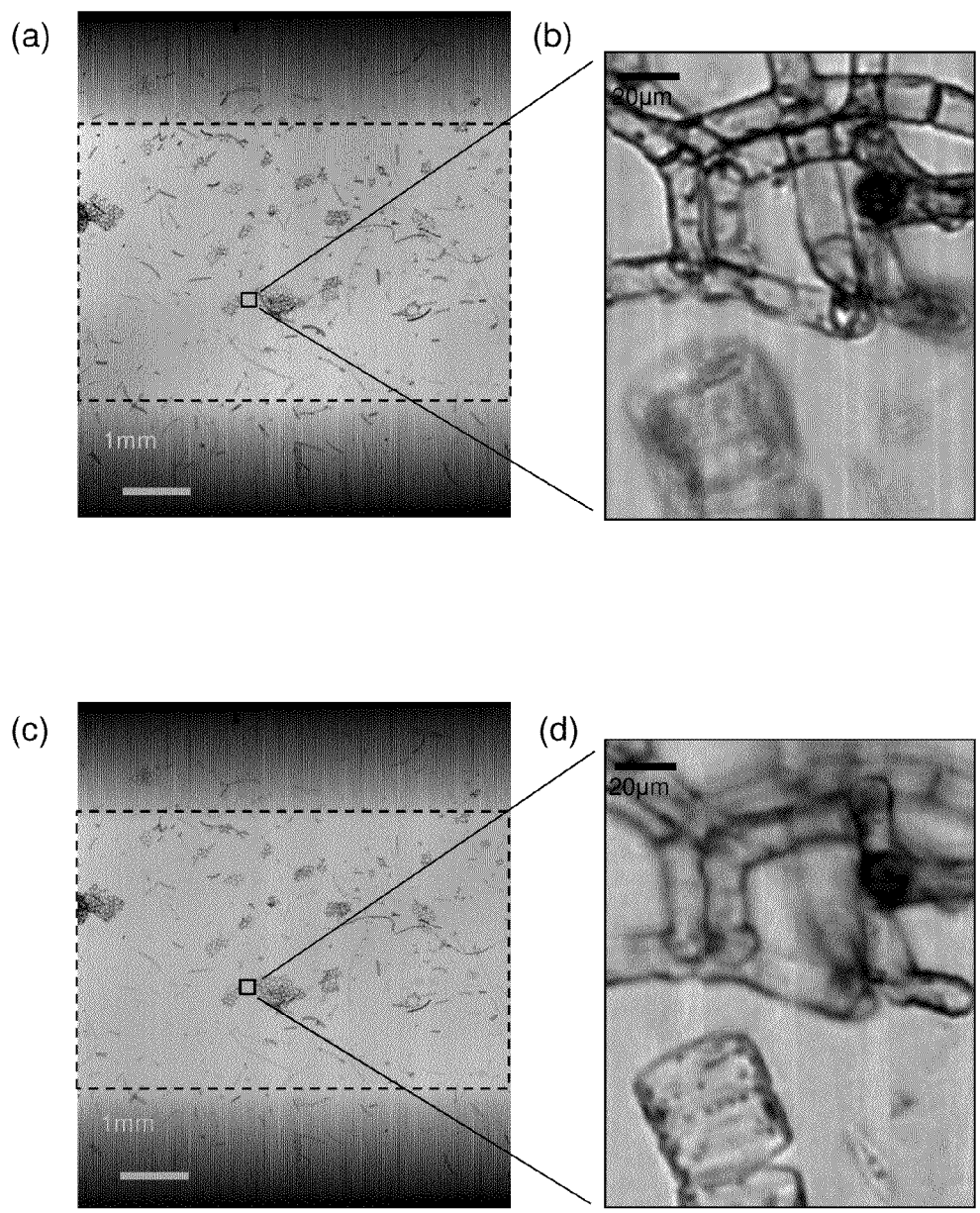
FIG. 8(a) is an image of the mixed green algae acquired by the TII system using the incident wavelengths $\lambda_1=692$ nm, according to an embodiment of the invention.
FIG. 8(b) is an expanded view of the region indicated in FIG. 8(a), according to an embodiment of the invention.
FIG. 8(c) is an image of the mixed green algae acquired by the TII system using the incident wavelengths $\lambda_1=702$ nm, according to an embodiment of the invention.
FIG. 8(d) is an expanded view of the region indicated in FIG. 8(c), according to an embodiment of the invention.

Next, the TII system 10 was used to acquire images of a mixed green algae microscope slide. Images were acquired at different focal planes corresponding to different incident wavelengths $\lambda_1$=692 nm and $\lambda_2$=702 nm. FIG. 8(a) is an image of the mixed green algae acquired by the TII system 10 using the incident wavelengths $\lambda_1$=692 nm, according to an embodiment of the invention. FIG. 8(b) is an expanded view of the region indicated in FIG. 8(a), according to an embodiment of the invention. FIG. 8(c) is an image of the mixed green algae acquired by the TII system 10 using the incident wavelengths $\lambda_1$=702 nm, according to an embodiment of the invention. FIG. 8(d) is an expanded view of the region indicated in FIG. 8(c), according to an embodiment of the invention. As shown in FIGS. 8(b) and 8(d), the TII system 10 focused at different focal planes and rendered high resolution images of the sample at the different focal planes.

IV. Flowchart

Figure 9:
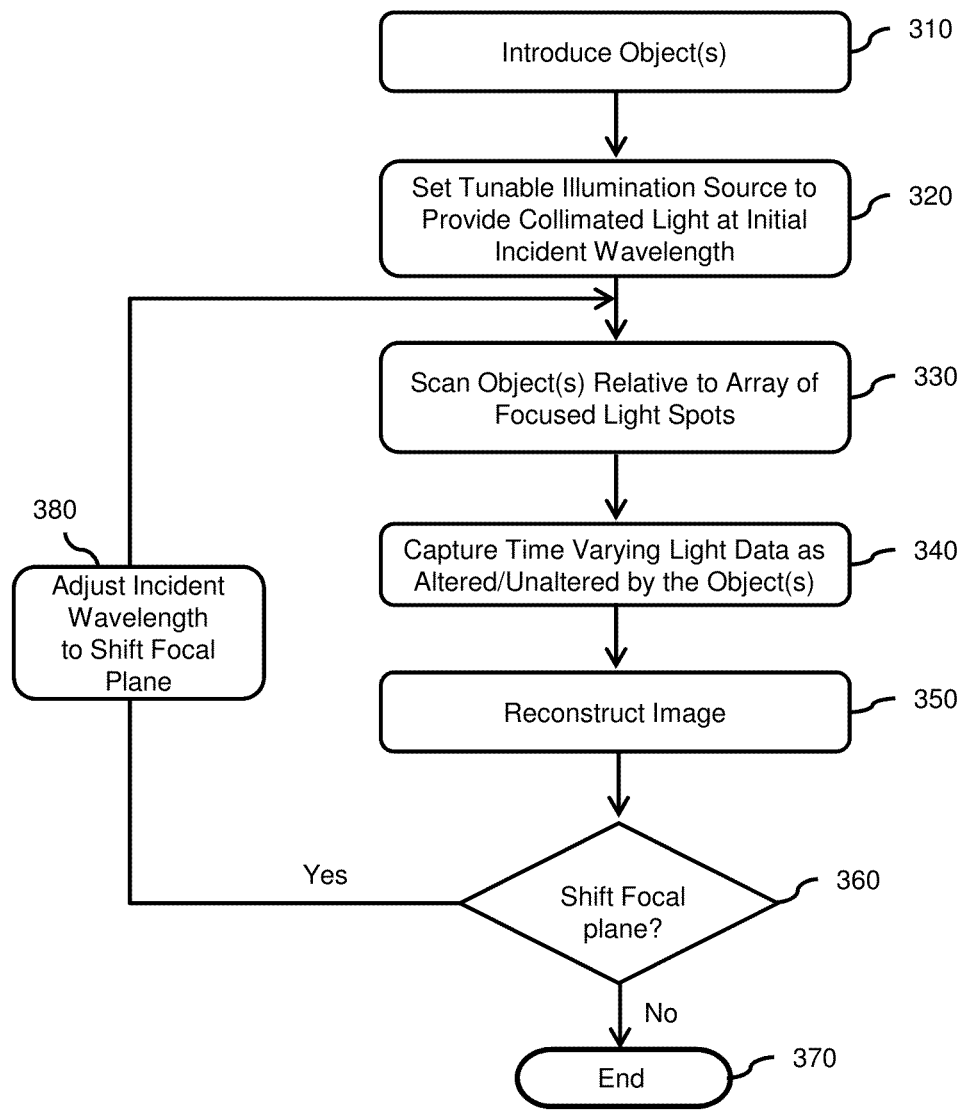
FIG. 9 is a flowchart of a method of focal plane tuning using a TII device, according to an embodiment of the invention.

FIG. 9 is a flow chart of an exemplary method of focal plane tuning using a TII system 10, according to embodiments of the invention. In step 310, the object 300 is introduced into the TII device 100 and received by the platform 130. The plane of interest is at a distance $z_1$ from the Talbot element 120, as shown, for example, in FIG. 4. In some cases, the platform 130 may be located so that a plane of interest 126 is located at a distance $z_1$ calculated as an integer multiple of a full or half Talbot distance from the Talbot element 120 such as shown in FIG. 4. If the Talbot element 120 is a square grid pattern the distance $z_1$ can be calculated using Eqn. 1 or Eqn. 3 where d is the pattern period of the square grid pattern and $\lambda=\lambda_0$, which is the initial incident wavelength.

In step 320, the tunable illumination source 110 is set to provide collimated light 112 to the Talbot element 120 at the initial incident wavelength of $\lambda_0$. In one case, the processor 210 may send a trigger signal to the tunable illumination source 110 to start generating collimated light 112 with an initial wavelength $\lambda_0$. The Talbot element 120 generates a light field with an array of focused light spots 124 located at a focal plane 125 at an initial distance $z_0$ from the Talbot element 120, as shown, for example, in FIG. 4. The initial distance $z_0$ may be away from a Talbot plane 120 if, for example, the initial wavelength $\lambda_0$ is comparable to the aperture size a of a Talbot element 120 comprising an array of light transmissive regions. In FIG. 4, the initial wavelength $\lambda_0$ is comparable to the aperture size a of the Talbot element 120 and the initial distance $z_0$ and calculated distance $z_1$ at the Talbot plane are separated by a distance $\Delta z=z_1-z_0$.

Figure 5:
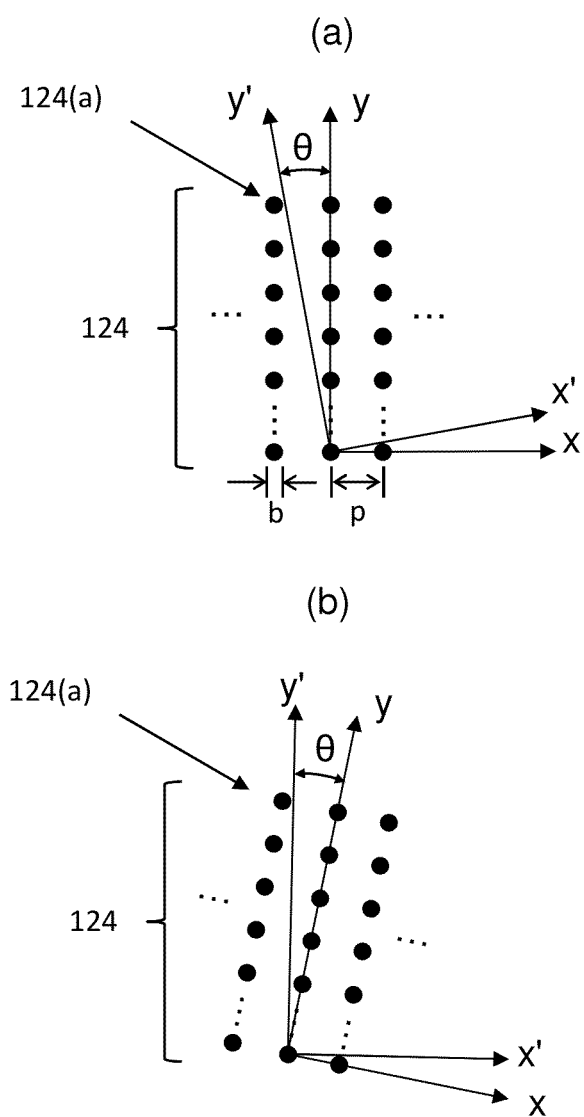
FIG. 5(a) is a illustration of an array of focused light spots on the Talbot element plane as generated by a Talbot element of a TII device, according to embodiments of the invention.
FIG. 5(b) is a illustration of an array of focused light spots on the Talbot element plane as generated by a Talbot element of a TII device, according to embodiments of the invention.

In step 330, the scanning mechanism 140 scans the object 300 (or the platform 130 with the object) in a scanning direction across the array of focused light spots 124 or scans the Talbot element 120 in a scanning direction across the object 300. The scanning direction can be any suitable direction. For example, the scanning direction may be in the x'-direction along the x'-axis or in the y'-direction along the y'-axis, as shown in FIG. 5. In one case, the processor 210 may send a start signal to the scanning mechanism 140 to start scanning and a signal to the light detector 160 to start an initial image acquisition cycle.

The object 300 alters light from the array of focused light spots 124. In one case, the relay lenses 150 receives light from the array of focused light spots 124 that has been altered and unaltered by the object 300 as the object 300 move relative to the array of focused light spots 124. The relay lenses 150 relay light to the light detector 160.

In step 340, the light detector 160 receives light altered/unaltered by the object 300 and captures time-varying light data (e.g., intensity data) of the altered and/or unaltered light as the object 300 moves relative to the array of focused light spots 124.

In step 350, the processor 210 can reconstruct one or more images at the focal plane 125 through the object 300 based on the time-varying light data from each focused light spot 124 and the scanning speed. The processor 210 can display the one or more images at the focal plane 125 on the display 230. The processor 210 may be separate from the light detector 210 or may be a part of the light detector 210. After image acquisition, the processor 210 may sent a stop signal to the scanning mechanism 140 to stop scanning.

In step 360, the processor 210 determines whether to shift the focal plane 125. The processor 210 may make the determination based on input from a user of the TII system 10 or makes the determination based on an analysis. For example, the user of the TII system 10 may determine that the current cross-sectional image of the object 300 is not at the desired plane of interest. In FIG. 4, for example, the first image taken at the focal plane at $z_0$ may not include the area of concern (e.g., nucleus) of the object 300 (e.g., cell) and the user may determine that another image at a distance slightly above the current focal plane is desired. As another example, the processor 210 may be able to determine that the cross sectional image is not in focus using an auto-focusing scheme at the area of concern.

If the processor 210 determines that the image is not at the plane of interest and to shift the focal plane, the method continues to step 370. The processor 210 may determine the plane shift $\Delta z$ based on input from a user of the TII system 10 or makes the determination based on an analysis. For example, the user of the TII system 10 may determine that the focal plane must be shifted along the z-axis by an increment $\Delta z$. As another example, the processor 210 may calculate the $\Delta z$ based on based on $z_1$ and $z_0$. In one embodiment, the processor 210 may automatically determine the $\Delta z$ in an autofocusing scheme. The processor 210 calculates the $\Delta \lambda$ based on the determined $\Delta z$ and current incident wavelength using Eqn. 5.

At step 380, the processor 210 may then send a signal to the tunable illumination source 110 to tune the focal plane 125 to a new focal plane 125 by adjusting the wavelength by the wavelength change $\Delta \lambda$. The tunable illumination source 110 will then adjust the incident wavelength by the wavelength change $\Delta \lambda$ to shift the focal plane. If the processor 210 determines that the image is at the plane of interest and not to shift the focal plane at step 360, the method ends at step 370.

V. Subsystems

Figure 10:
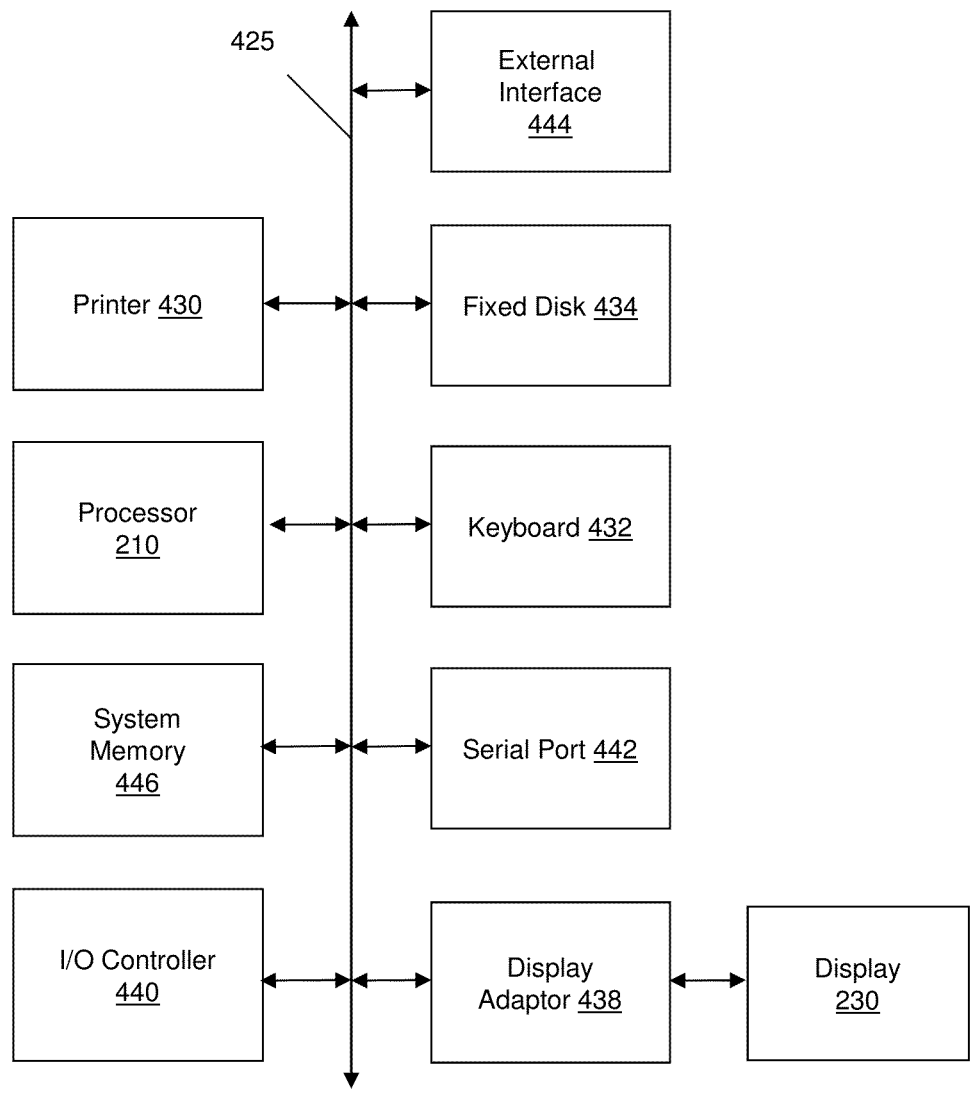
FIG. 10 is a block diagram of subsystems that may be present in the TII system, according to embodiments of the invention.

FIG. 10 is a block diagram of subsystems that may be present in the TII system 10, according to embodiments of the invention. For example, the TII system 10 includes a processor 210. The processor 210 may be a component of the light detector 160 in some cases.

The various components previously described in the Figures may operate using one or more of the subsystems to facilitate the functions described herein. Any of the components in the Figures may use any suitable number of subsystems to facilitate the functions described herein. Examples of such subsystems and/or components are shown in a FIG. 10. The subsystems shown in FIG. 10 are interconnected via a system bus 425. Additional subsystems such as a printer 430, keyboard 432, fixed disk 434 (or other memory comprising computer readable media), display 230, which is coupled to display adapter 438, and others are shown. The display 230 may include the illuminating display 116 and/or the image display 230. Peripherals and input/output (I/O) devices, which couple to I/O controller 440, can be connected to the computer system by any number of means known in the art, such as serial port 442. For example, serial port 442 or external interface 444 can be used to connect the computer apparatus to a wide area network such as the Internet, a mouse input device, or a scanner. The interconnection via system bus allows the processor 210 to communicate with each subsystem and to control the execution of instructions from system memory 446 or the fixed disk 434, as well as the exchange of information between subsystems. The system memory 446 and/or the fixed disk 434 may embody a CRM 220. Any of these elements may be present in the previously described features.

In some embodiments, an output device such as the printer 430 or display 230 of the TII system 10 can output various forms of data. For example, the TII system 10 can output 2D/3D color/monochromatic images, data associated with these images, or other data associated with analyses performed by the TII system 10.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a CRM, such as a random access memory (RAM), a read only memory (ROM), a magnetic medium such as a hard-drive or a floppy disk, or an optical medium such as a CD-ROM. Any such CRM may reside on or within a single computational apparatus, and may be present on or within different computational apparatuses within a system or network.

A recitation of "a", "an" or "the" is intended to mean "one or more" unless specifically indicated to the contrary.

The above description is illustrative and is not restrictive. Many variations of the disclosure will become apparent to those skilled in the art upon review of the disclosure. The scope of the disclosure should, therefore, be determined not with reference to the above description, but instead should be determined with reference to the pending claims along with their full scope or equivalents.

One or more features from any embodiment may be combined with one or more features of any other embodiment without departing from the scope of the disclosure. Further, modifications, additions, or omissions may be made to any embodiment without departing from the scope of the disclosure. The components of any embodiment may be integrated or separated according to particular needs without departing from the scope of the disclosure.

All patents, patent applications, publications, and descriptions mentioned above are hereby incorporated by reference in their entirety for all purposes. None is admitted to be prior art.

What is claimed is:

1. A Talbot-illuminated imaging device for focal plane tuning, the device comprising:
    a Talbot element configured to generate an array of focused light spots at a focal plane;
    a tunable illumination source configured to shift the focal plane to a plane of interest by adjusting a wavelength of light incident the Talbot element;
    a scanning mechanism configured to move an object relative to the array of focused light spots in a scanning direction; and
    a light detector configured to determine time-varying light data associated with the array of focused light spots as the object moves relative to the array of focused light spots, wherein the object is located between the Talbot element and the light detector.

2. The Talbot-illuminated imaging device for focal plane tuning of claim 1, further comprising a processor configured to reconstruct an image of the object based on the time-varying light data.

3. The Talbot-illuminated imaging device for focal plane tuning of claim 1, wherein the light detector is further configured to reconstruct an image of the object based on the time-varying light data.

4. The Talbot-illuminated imaging device for focal plane tuning of claim 1, further comprising a platform between the object and the Talbot element, the platform for receiving the object.

5. The Talbot-illuminated imaging device for focal plane tuning of claim 1, further comprising relay lenses between the object and the light detector.

6. The Talbot-illuminated imaging device for focal plane tuning of claim 1, wherein the focal plane is located away from a Talbot plane.

7. The Talbot-illuminated imaging device for focal plane tuning of claim 1, wherein the Talbot element is an array of light transmissive regions.

8. The Talbot-illuminated imaging device for focal plane tuning of claim 1, wherein the Talbot element is a microlens array.

9. The Talbot-illuminated imaging device for focal plane tuning of claim 1, wherein the focal plane is located away from a Talbot plane.

10. The Talbot-illuminated imaging device for focal plane tuning of claim 1, wherein the scanning mechanism is configured to move the object across the array of focused light spots.

11. The Talbot-illuminated imaging device for focal plane tuning of claim 1, wherein the scanning mechanism is configured to move the Talbot element to move the array of focused light spots across the object.

12. The Talbot-illuminated imaging device for focal plane tuning of claim 1, wherein the scanning mechanism is configured to move a platform with the object across the array of focused light spots.

13. A Talbot-illuminated imaging system for focal plane tuning, the system comprising:
- a Talbot-illuminated imaging device comprising
  - a Talbot element configured to generate an array of focused light spots at a focal plane,
  - a tunable illumination source configured to shift the focal plane to a plane of interest by adjusting a wavelength of light incident the Talbot element,
  - a scanning mechanism configured to move an object relative to the array of focused light spots in a scanning direction, and
  - a light detector configured to determine time-varying light data associated with the array of focused light spots as the object moves relative to the array of light spots; and
- a processor configured to reconstruct an image of the object based on the time-varying light data.

14. The Talbot-illuminated imaging system for focal plane tuning of claim 13, wherein the object is located between the Talbot element and the light detector.

15. The Talbot-illuminated imaging system for focal plane tuning of claim 13, wherein the light detector includes the processor.

16. A method of focal plane tuning using a Talbot-illuminated imaging system having a Talbot element, a tunable illumination source, a scanning mechanism and a light detector, the method comprising:
- providing light of an incident wavelength to the Talbot element to generate an array of focused light spots;
- adjusting, by the tunable illumination source, the incident wavelength to shift the focal plane of the array of focused light spots;
- capturing time-varying light data associated with the array of focused light spots as an object moves relative to the array of focused light spots; and
- constructing an image of the object based on the time varying light data.

17. The method of focal plane tuning of claim 16, wherein the tunable illumination source adjusts the incident wavelength to tune the focal plane to a plane of interest.

18. The method of focal plane tuning of claim 16, wherein the Talbot element is an array of light transmissive regions.

19. The method of focal plane tuning of claim 16, wherein the Talbot element is a microlens array.

* * * * *

UNITED STATES PATENT AND TRADEMARK OFFICE
CERTIFICATE OF CORRECTION

PATENT NO. : 8,946,619 B2  
APPLICATION NO. : 13/451543  
DATED : February 3, 2015  
INVENTOR(S) : Jigang Wu et al.

Page 1 of 1

It is certified that error appears in the above-identified patent and that said Letters Patent is hereby corrected as shown below:

In the Specification

Column 1, lines 25-31, Delete under STATEMENT REGARDING FEDERALLY SPONSORED RESEARCH AND DEVELOPMENT:
"The U.S. Government has certain rights in this invention pursuant to Grant No. W81XWH-09-1-0051 awarded by the US Army Medical Research and Material Command."

Add under STATEMENT REGARDING FEDERALLY SPONSORED RESEARCH AND DEVELOPMENT:
"This invention was made with government support under Grant No. W81XWH-09-1-0051 awarded by the US Army Medical Research and Material Command and Grant No. AI096226 awarded by the National Institutes of Health. The government has certain rights in the invention."

Signed and Sealed this  
Fifth Day of May, 2015

Michelle K. Lee  
*Director of the United States Patent and Trademark Office*